(12) United States Patent　(10) Patent No.:　US 11,787,464 B2
　　　Iizawa　　　　　　　　　　　　　　(45) Date of Patent:　　Oct. 17, 2023

(54) VEHICLE STEERING SYSTEM AND COUPLING-MECHANISM SWITCHING METHOD

(71) Applicant: Toyota Jidosha Kabushiki Kaisha, Toyota (JP)

(72) Inventor: Takafumi Iizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 17/204,453

(22) Filed: Mar. 17, 2021

(65) Prior Publication Data

US 2021/0300456 A1　Sep. 30, 2021

(30) Foreign Application Priority Data

Mar. 30, 2020　(JP) .................. 2020-059699

(51) Int. Cl.
　　*B60W 50/12*　　(2012.01)
　　*B60W 50/16*　　(2020.01)
　　*B62D 1/04*　　(2006.01)
　　*B62D 1/181*　　(2006.01)
　　*B62D 5/04*　　(2006.01)
　　*B62D 5/00*　　(2006.01)
　　*B62D 6/00*　　(2006.01)

(52) U.S. Cl.
　　CPC ............. *B62D 5/003* (2013.01); *B62D 6/008* (2013.01); *B62D 5/0463* (2013.01)

(58) Field of Classification Search
　　None
　　See application file for complete search history.

(56) References Cited

U.S. PATENT DOCUMENTS

| 2016/0368522 | A1* | 12/2016 | Lubischer | ............. B62D 1/105 |
| 2017/0369091 | A1  | 12/2017 | Nash et al. | |
| 2019/0077438 | A1  | 3/2019  | Collier et al. | |
| 2019/0232975 | A1  | 8/2019  | Kodera | |
| 2019/0308662 | A1  | 10/2019 | Christiansen | |
| 2020/0017123 | A1* | 1/2020  | Aizawa | ............. B60W 60/0051 |

FOREIGN PATENT DOCUMENTS

| CN | 110091908 A    | 8/2019 |
| DE | 102019000035 A1 | 5/2019 |
| DE | 102017220769 A1 | 6/2019 |

(Continued)

*Primary Examiner* — Adam D Tissot
*Assistant Examiner* — Laura E Linhardt
(74) *Attorney, Agent, or Firm* — Dinsmore & Shohl LLP

(57) ABSTRACT

A vehicle steering system provided for a vehicle whose driving state is switchable between a manual driving state and an automatic driving state, the vehicle steering system including a coupling mechanism configured to couple a steering operation member operated by a driver and at least one steerable wheel of the vehicle, wherein, when the driving state of the vehicle is switched from the manual driving state to the automatic driving state, the coupling mechanism is switched from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other.

9 Claims, 15 Drawing Sheets

(56) References Cited

FOREIGN PATENT DOCUMENTS

| | | |
|---|---|---|
| DE | 102019108916 A1 | 10/2019 |
| JP | 2004009989 A | 1/2004 |
| JP | 2018069788 A | 5/2018 |
| JP | 2018-144783 A | 9/2018 |
| JP | 2019-142337 A | 8/2019 |

* cited by examiner

REARWARD (UPSTREAM)　　　　　　　　　　FORWARD (DOWNSTREAM)

UPSTREAM (REARWARD)     DOWNSTREAM (FORWARD)

UPSTREAM (REARWARD)     DOWNSTREAM (FORWARD)

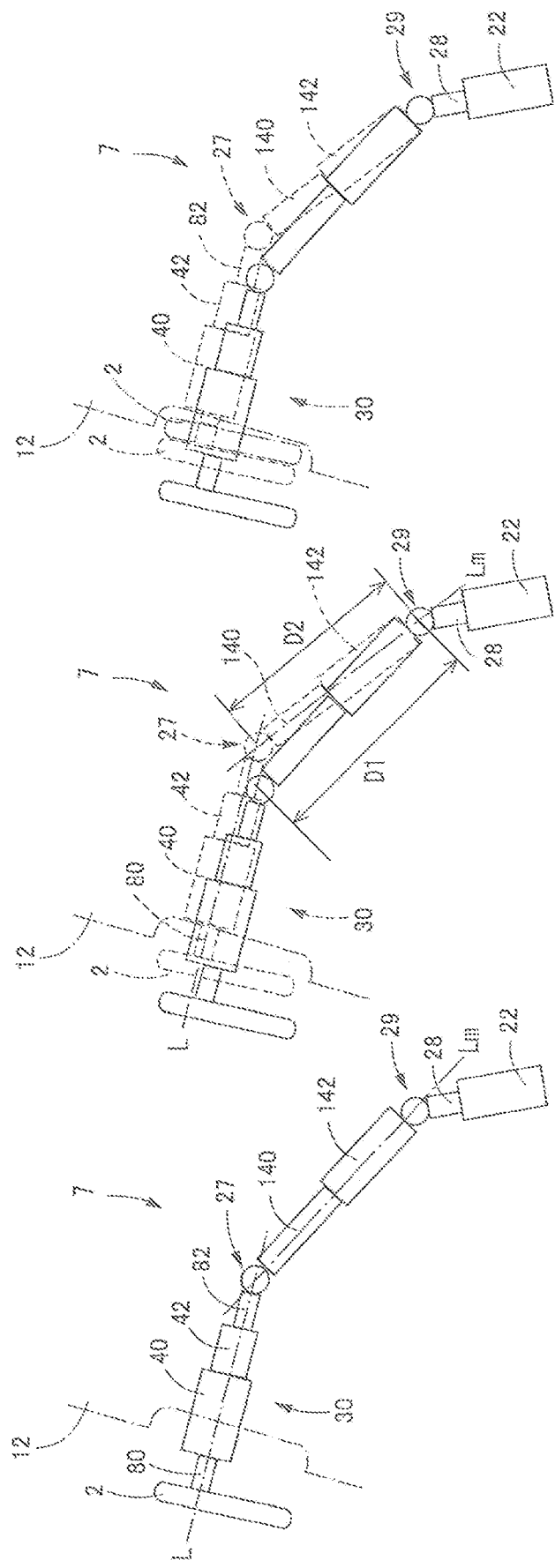

VEHICLE STEERING SYSTEM AND COUPLING-MECHANISM SWITCHING METHOD

CROSS REFERENCE TO RELATED APPLICATION

The present application claims priority to Japanese Patent Application No. 2020-059699, which was filed on Mar. 30, 2020, the disclosure of which is herein incorporated by reference in its entirety.

BACKGROUND

Technical Field

The following disclosure relates to a steering system provided for a vehicle whose driving state is switchable between a manual driving state and an automatic driving state, and further relates to a method of switching a coupling mechanism of the steering system.

Description of Related Art

Patent Document 1 (Japanese Patent Application Publication No. 2019-142337) and Patent Document 2 (Japanese Patent Application Publication No. 2018-144783) describe a steering system provided for a vehicle whose driving state is switchable between a manual driving state and an automatic driving state. In the vehicle steering system described in Patent Document 1, a steering wheel that is a steering operation member is located farther from a driver in the automatic driving state than in the manual driving state. The vehicle steering system described in Patent Document 2 is a steer-by-wire steering system. In the automatic driving state, interconnection between the steering wheel (the steering operation member) and tires of the vehicle via electric signals is cut, so that the steering wheel can be operated independently of movements of the tires.

SUMMARY

An aspect of the present disclosure relates to an improvement of a steering system provided for a vehicle whose driving state is switchable between a manual driving state and an automatic driving state such as an improvement in vehicle cabin comfort in the automatic driving state.

The present vehicle steering system includes a coupling mechanism configured to couple a steering operation member and at least one steerable wheel. When a driving state of the vehicle is switched from the manual driving state to the automatic driving state, the coupling mechanism is switched from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other. As a result, even if a force is applied to the steering operation member in the automatic driving state, steering of the at least one steerable wheel is not influenced, in other words, it does not matter if a force is applied to the steering wheel in the automatic driving state. According to the present disclosure, the vehicle cabin comfort in the automatic driving state can be improved.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which:

FIG. 18A is a view illustrating a state of the vehicle steering system in the manual driving state of the vehicle;

FIG. 18B is a view illustrating a state of the vehicle steering system in which the column is moved in a forward direction of the vehicle;

FIG. 18C is a view illustrating a state of the vehicle steering system in the automatic driving state of the vehicle;

DETAILED DESCRIPTION

Figure 1:
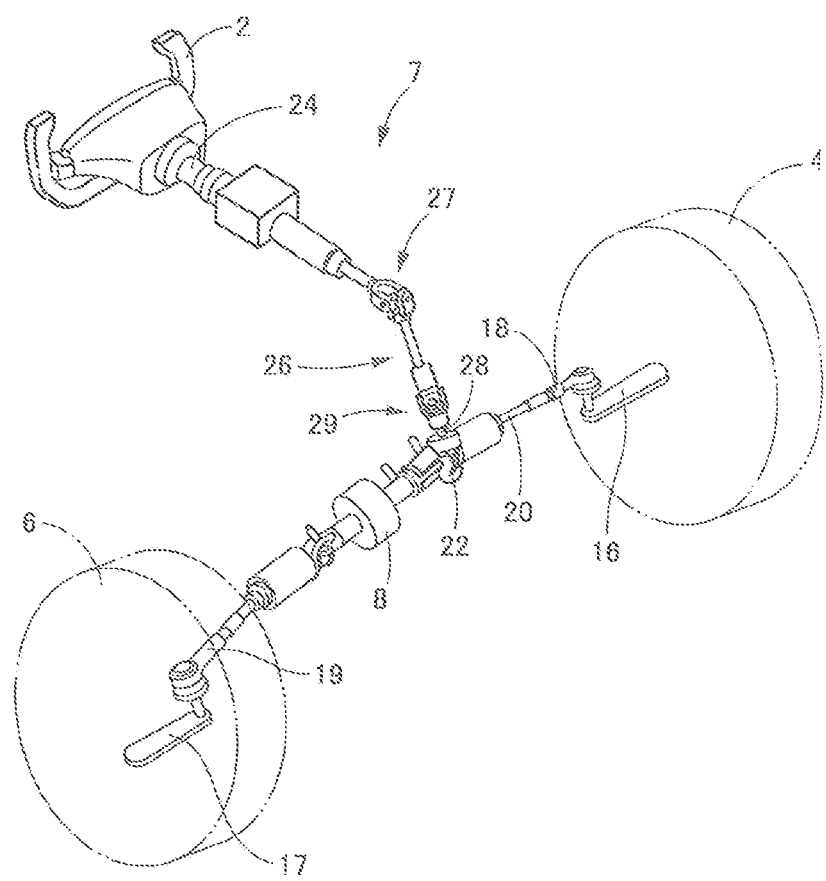
FIG. 1 is a conceptual view of a vehicle steering system according to a first embodiment.

Referring to the drawings, there will be explained a vehicle steering system according to one embodiment. A vehicle for which the present steering system is provided is configured such that a driving state of the vehicle is switchable between an automatic driving state and a manual driving state. In the present vehicle steering system, a coupling-mechanism switching method is executed.

First Embodiment

In the vehicle steering system illustrated in FIG. 1, a steering wheel 2, as a steering operation member operated by a driver, and front right and left wheels 4, 6, each as at least one steerable wheel of the vehicle, are coupled by a coupling mechanism 7. In the manual driving state of the vehicle, the coupling mechanism 7 is in a mechanically coupling state in which the coupling mechanism 7 mechanically couples the steering wheel 2 and the front right and left wheels 4, 6 to each other. When the driving state of the vehicle is switched from the manual driving state to the automatic driving state, the mechanical coupling between the steering wheel 2 and the front right and left wheels 4, 6 is disengaged. In the automatic driving state, the coupling mechanism 7 is in the mechanically decoupling state, and the front right and left wheels 4, 6 are steered by an automatic steering device 8.

The front right and left wheels 4, 6 are coupled to each other by knuckle arms 16, 17, tie rods 18, 19, and a rack bar 20. The steering wheel 2 is coupled to the rack bar 20 via a steering gear box (hereinafter simply referred to as "gear box") 22, etc.

Figure 7A:
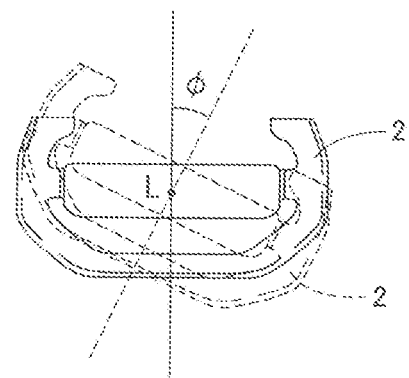
FIG. 7A is a front view of a steering wheel of the vehicle steering system.

As illustrated in FIG. 7A, the steering wheel 2 has a rectangular shape in front view that is long in a width direction of the vehicle. The steering wheel 2 is rotatable about an axis L and includes, at its longitudinally opposite ends, grip portions that can be gripped by the driver. The position (phase) of the steering wheel 2 illustrated by the solid line in FIG. 7A is a neutral position. In the mechanically coupling state, a rotation angle φ about the axis L from the neutral position corresponds to a steering angle of the front right and left wheels 4, 6. That is, the neutral position of the steering wheel 2 conceptually means a position at which the steering angle of the front right and left wheels 4, 6 is 0. When the steering wheel 2 is located at the neutral position, the vehicle is considered to be in a substantially straight traveling state.

Figure 7B:
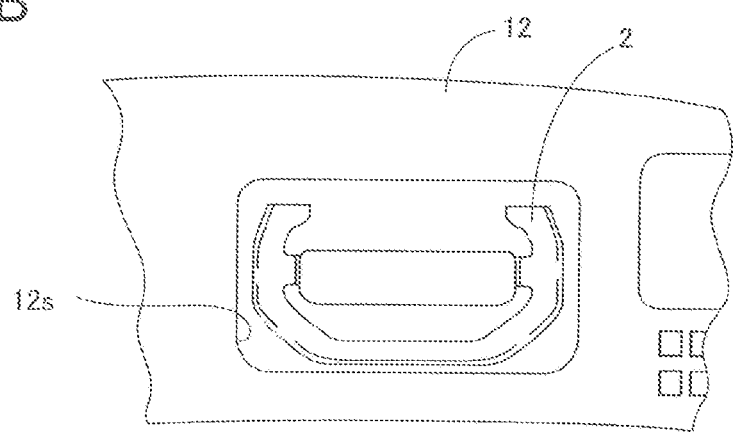
FIG. 7B is a view illustrating a state in which the steering wheel is stored.

As illustrated in FIG. 7B, the steering wheel 2 is storable, in the automatic driving state, in a storage recess 12s provided in a control panel 12. The storage recess 12s has substantially the same shape as the steering wheel 2 located at the neutral position and has substantially the same size as the steering wheel 2. In the present embodiment, the storage recess 12s has a generally rectangular shape that is long in the vehicle width direction.

Figure 2:
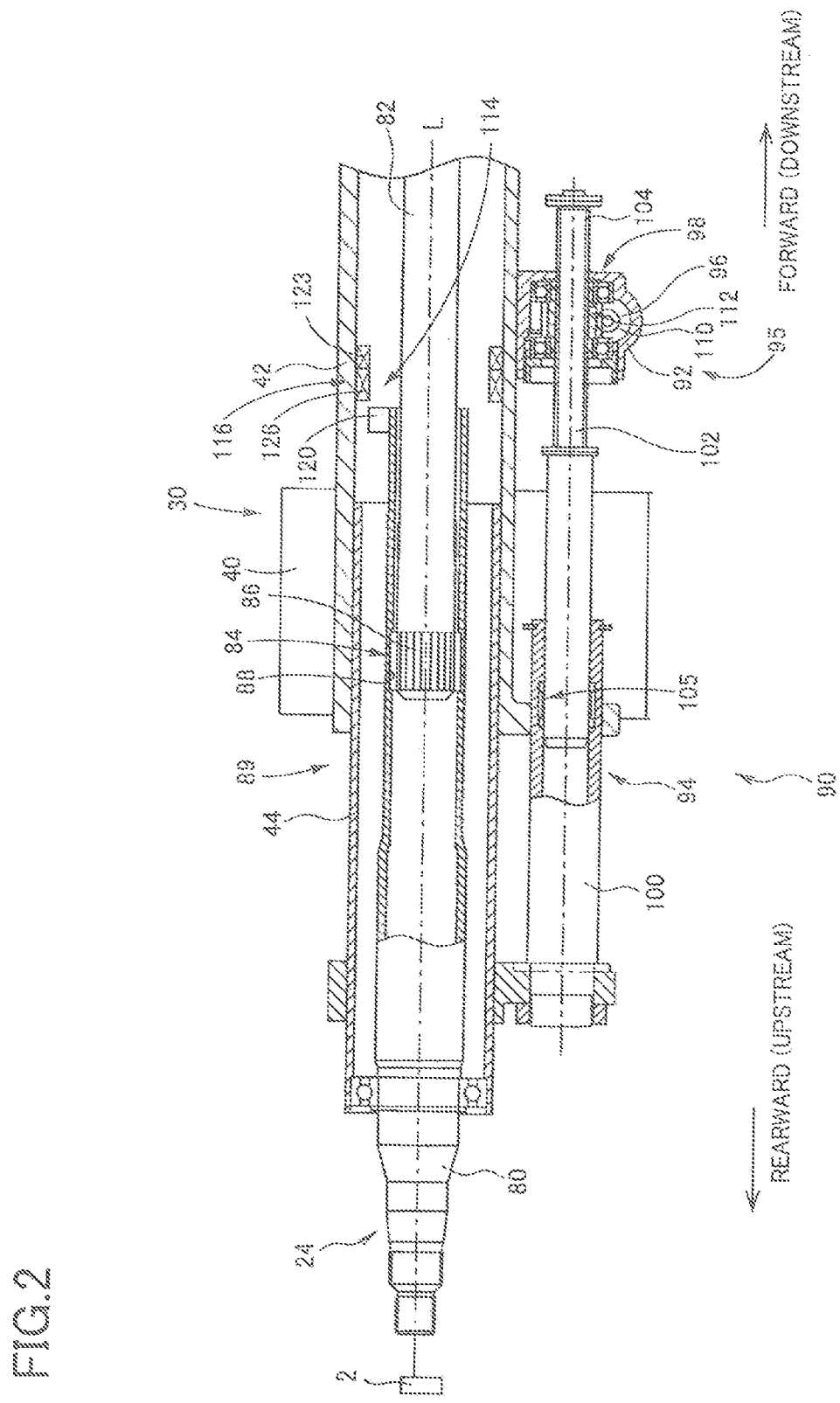
FIG. 2 is a cross-sectional view of a column of the vehicle steering system and components therearound.
Figure 3:
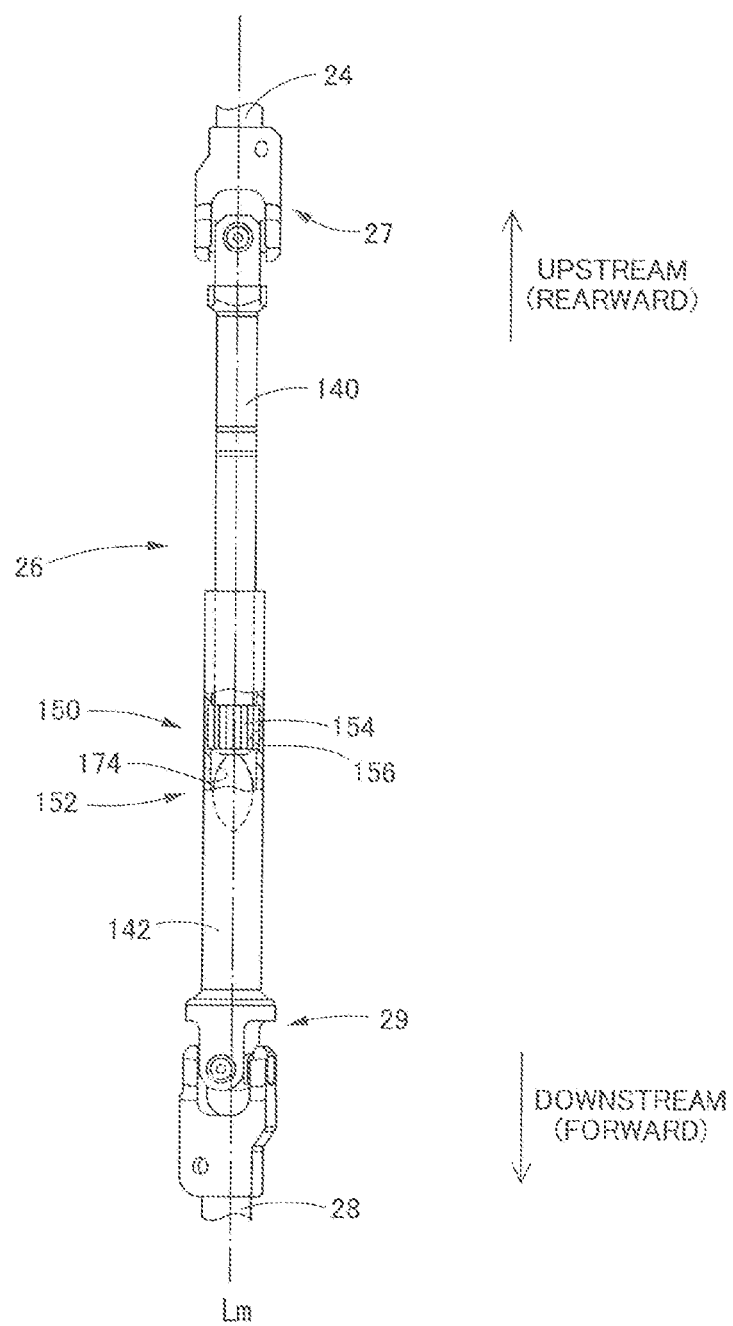
FIG. 3 is a perspective view of an intermediate shaft of the vehicle steering system.

As illustrated in FIG. 2, a steering shaft 24 is coupled to the steering wheel 2 such that the steering shaft 24 is rotatable about its axis L integrally with the steering wheel 2. As illustrated in FIG. 3, an intermediate shaft 26 is coupled to the steering shaft 24 such that the intermediate shaft 26 is rotatable about its axis Lm integrally with the steering shaft 24 via a universal joint 27. An output rod 28 is coupled to the intermediate shaft 26 such that the output rod 28 is rotatable integrally with the intermediate shaft 26 via a universal joint 29. A pinion gear (not illustrated) is coupled to the output rod 28 such that the pinion gear is rotatable integrally with the output rod 28. The pinion gear is in engagement with a toothed portion of the rack bar 20. Thus, the gear box 22 has a motion converting function attained by the pinion gear, the toothed portion of the rack bar 20, etc.

When an operation torque is applied to the steering wheel 2 and the steering wheel 2 is thereby rotated about the axis L, the rotation of the steering wheel 2 is converted, via the gear box 22, into a movement of the rack bar 20 in the vehicle width direction, i.e., a right-left direction, so that the front right and left wheels 4, 6 are steered. The operation torque applied by the steering wheel 2 is transmitted to the rack bar 20 via the gear box 22 and applied to the front right and left wheels 4, 6. In the present embodiment, the state in which the operation torque applied to the steering wheel 2 is mechanically transmitted to the front right and left wheels 4, 6 is the mechanically coupling state of the coupling mechanism 7.

As illustrated in FIG. 2, the steering shaft 24 is held by a column 30 that is supported by a body 32 of the vehicle (FIG. 4), such that the steering shaft 24 is rotatable about the axis L. The column 30 includes: a housing 40 supported by the vehicle body 32; an outer column 42 held by the housing 40 so as to be unrotatable about the axis L relative to the housing 40 and so as to be immovable relative to the housing 40 in an axial direction in which the axis L extends; and an inner column 44 located inwardly of the outer column 42 so as to be movable relative to the outer column 42 in the axial direction.

Figure 4:
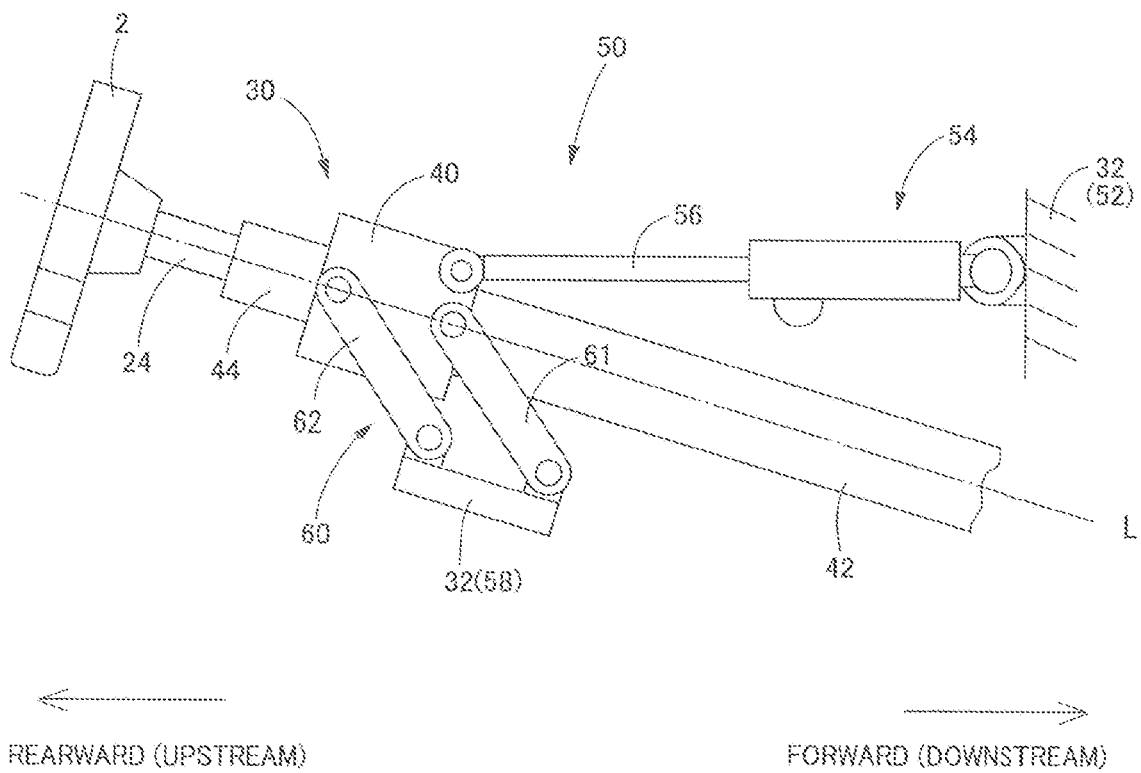
FIG. 4 is a side view conceptually illustrating the column and components therearound.
Figure 5:
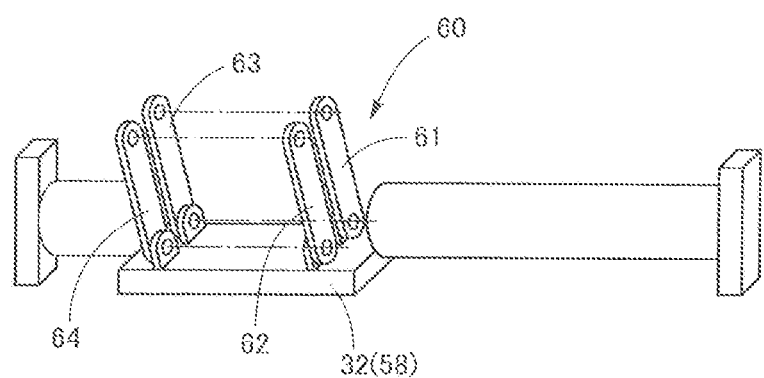
FIG. 5 is a perspective view illustrating a part (column moving mechanism) in FIG. 4.
Figure 6:
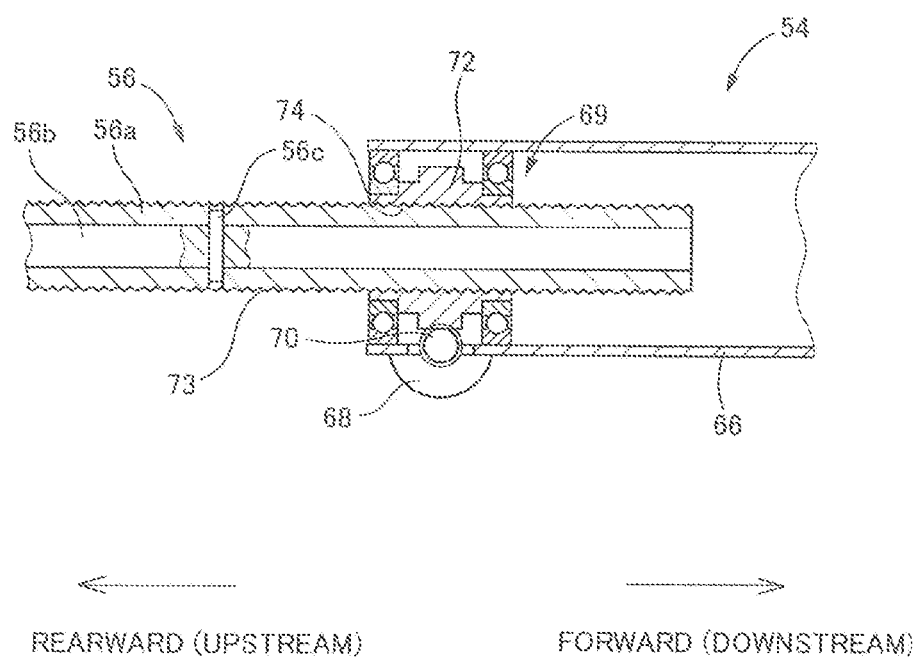
FIG. 6 is a cross-sectional view illustrating a part (column moving actuator) in FIG. 4.

The present vehicle steering system includes a column moving device 50 configured to move the column 30 in the front-rear direction relative to the vehicle body 32. As illustrated in FIGS. 4-6, the column moving device 50 is disposed between the column 30 and the vehicle body 32. The column moving device 50 includes: a column moving actuator 54 held by a dash board 52 that is a constituent element of the vehicle body 32; and a drive rod 56 extending generally in the front-rear direction of the vehicle.

The housing 40 is supported by an instrument panel reinforcement (hereinafter referred to as "instrument panel R/F) 58 that is a constituent element of the vehicle body 32 via a link mechanism 60 as a column moving mechanism. As illustrated in FIG. 5, the link mechanism 60 includes four link members 61-64 extending in parallel with each other. Each link member 61-64 is coupled at one end thereof to the instrument panel R/F 58 so as to be pivotable about an axis that extends in the vehicle width direction and coupled at the other end thereof to the housing 40 so as to be pivotable about the axis that extends in the vehicle width direction.

As illustrated in FIG. 6, the column moving actuator 54 includes: a housing 66 held by the dash board 52 so as to be pivotable about the axis that extends in the vehicle width direction; an electric motor 68, as a drive source, held by the housing 66; and a motion converting mechanism 69 for converting rotation of the electric motor 68 into a linear movement of the drive rod 56. The motion converting mechanism 69 includes: a worm gear 70 provided on an output shaft of the electric motor 68 so as to be rotatable integrally with the output shaft; and a worm wheel 72 threadedly engaged with the worm gear 70. An internally threaded portion 74 is formed on an inner circumferential surface of the worm wheel 72, so as to be threadedly engaged with an externally threaded portion 73 formed on the drive rod 56. The worm wheel 72 is held by the housing 66 so as to be immovable and rotatable relative to the housing 66. The drive rod 56 is held by the housing 66 so as to be unrotatable and movable relative to the housing 66.

The drive rod 56 includes an outer cylindrical member 56a and an inner rod 56b. The externally threaded portion 73 described above is formed on an outer circumferential portion of the outer cylindrical member 56a. A distal end portion of the inner rod 56b protrudes from the outer cylindrical member 56a and is coupled to the housing 40. The inner rod 56b and the outer cylindrical member 56a are coupled to each other, by an engagement pin 56c that radially extends, such that the inner rod 56b and the outer cylindrical member 56a are movable integrally with each other. In a normal condition, the outer cylindrical member 56a and the inner rod 56b are moved integrally with each other owing to the engagement pin 56c. In a case where a large force is applied to the housing 40 in the front-rear direction, the engagement pin 56c is broken, so that the inner rod 56b is allowed to move relative to the outer cylindrical member 56a.

When the electric motor 68 is driven, the worm gear 70 is rotated and the worm wheel 72 is accordingly rotated. As a result, the drive rod 56 is moved in the front-rear direction, and the column 30 is moved by the link mechanism 60 in the front-rear direction of the vehicle. Thus, the position of the steering wheel 2 is changed or displaced in the front-rear direction.

In the present embodiment, the motion converting mechanism 69 includes the worm gear 70 and the worm wheel 72, and negative efficiency (reverse efficiency) is relatively high. Accordingly, a clutch is not essential.

The structure of the motion converting mechanism 69 is not limited to a particular one. The motion converting mechanism 69 may include an ordinary screw mechanism, for example. In such a case, a clutch is provided. By engaging and disengaging the clutch, the column 30 can be switched between a state in which a movement of the column 30 is allowed and a state in which the movement of the column 30 is inhibited. In the state in which the movement of the column 30 is allowed, the column 30 can be moved by an operation of the driver.

The steering shaft 24 extends generally in the front-rear direction of the vehicle. As illustrated in FIG. 2, the steering shaft 24 includes: a cylindrical outer shaft 80 rotatable about the axis L integrally with the steering wheel 2; and an inner shaft 82 disposed inwardly of the outer shaft 80 so as to be movable relative to the outer shaft in the axial direction in which the axis L extends. The outer shaft 80 is held by the inner column 44 so as to be rotatable about the axis L and immovable in the axial direction, relative to the inner column 44. The inner shaft 82 is held by the outer column 42 so as to be rotatable about the axis L and immovable in the axial direction, relative to the outer column 42.

A rotation transmitter 84 is disposed between the outer shaft 80 and the inner shaft 82. The rotation transmitter 84 is configured to transmit rotation of the outer shaft 80 and rotation of the inner shaft 82 therebetween. In the present embodiment, the rotation transmitter 84 is provided between an intermediate portion of the outer shaft 80 and a distal end portion of the inner shaft 82. The rotation transmitter 84 includes a plurality of protrusions 86 provided at an outer circumferential portion of the inner shaft 82 and a plurality of recesses provided at an inner circumferential portion of the outer shaft 80.

In a state in which the protrusions 86 and the recesses 88 are in serration engagement, the outer shaft 80 and the inner shaft 82 are integrally rotatable. The state in which the protrusions 86 and the recesses 88 are in serration engagement is a transmission state of the rotation transmitter 84 in which the rotation of the outer shaft 80 and the rotation of the inner shaft 82 are transmittable therebetween. In a state in which the protrusions 86 and the recesses 88 are not in engagement with each other, the outer shaft 80 and the inner shaft 82 are rotatable relative to each other. The state in which the protrusions 86 and the recesses 88 are not in serration engagement is a non-transmission state of the rotation transmitter 84 in which the rotation of the outer shaft 80 and the rotation of the inner shaft 82 are untransmittable therebetween.

The rotation transmitter may be configured to include one protrusion 86 and one recess 88. In this case, the one protrusion 86 and the one recess 88 are in a spline engagement with each other in the transmission state.

In the present embodiment, the steering shaft 24 and the column 30 constitute a telescopic structure. That is, the inner column 44 and the outer shaft 80 are movable relative to the outer column 42 and the inner shaft 82 generally in the front-rear direction of the vehicle. This configuration enables the position of the steering wheel 2 to be changed in the front-rear direction of the vehicle. In the present embodiment, the telescopic structure of the steering shaft 24 and the column 30 will be referred to as a telescopic moving mechanism 89 as a telescopic position changing mechanism.

The present steering system includes a telescopic moving device 90 by which the steering shaft 24 is movable in the front-rear direction of the vehicle, whereby the position of the steering wheel 2 in the front-rear direction of the vehicle is changeable.

The telescopic moving device 90 includes: a housing 92 fixed to the outer column 42; a drive rod 94 extending generally in the front-rear direction of the vehicle, i.e., the axial direction in which the axis L extends; and a telescopic actuator 95 provided in the housing 92.

The drive rod 94 includes an outer cylindrical member 100 and an inner rod 102 disposed inwardly of the outer cylindrical member 100. A rear end portion of the outer cylindrical member 100 is attached to the inner column 44. The outer cylindrical member 100 is held at an intermediate portion thereof by the outer column 42 so as to be movable relative to the outer column 42 in the axial direction in which the axis L extends and so as to be unrotatable about the axis L relative to the outer column 42. A rear end portion of the inner rod 102 is held by an inner circumferential portion of the outer cylindrical member 100. An externally threaded portion 104 is formed at an outer circumferential portion of a front end portion of the inner rod 102. The inner rod 102 and the outer cylindrical member 100 engage with each other via an engagement portion 105. The engagement portion 105 includes a spring (not illustrated). The engagement portion 105 normally allows the inner rod 102 and the outer cylindrical member 100 to engage with each other such that the inner rod 102 and the outer cylindrical member 100 are unrotatable relative to each other and movable integrally with each other in the axial direction in which the axis L extends. In a case where a large force is applied to the outer cylindrical member 100 in the axial direction indicated above, the engagement portion 105 allows the outer cylindrical member 100 to move relative to the inner rod 102.

The telescopic actuator 95 includes an electric motor 96 as a drive source and a motion converting mechanism 98 for converting rotation of the electric motor 96 into a linear movement of the drive rod 94. The motion converting mechanism 98 includes: a worm gear 110 provided on an output shaft of the electric motor 96 so as to be rotatable integrally with the output shaft; and a worm wheel 112. The worm wheel 112 has, on its outer circumferential surface, a helical gear portion threadedly engageable with the worm gear 110 and has, on its inner circumferential surface, an internally threaded portion threadedly engageable with the externally threaded portion 104 of the inner rod 102. The worm wheel 112 is held by the housing 92 so as to be immovable and rotatable relative to the housing 92.

The vehicle steering system includes a neutral position holder 114 and a neutral position guide 116.

The neutral position holder 114 is for holding the steering wheel 2 at the neutral position when the steering wheel 2 is stored in the storage recess 12s of the control panel 12. The neutral position holder 114 is provided between an inner circumferential portion of the outer column 42 and an outer circumferential portion of the outer shaft 80.

Figure 8:
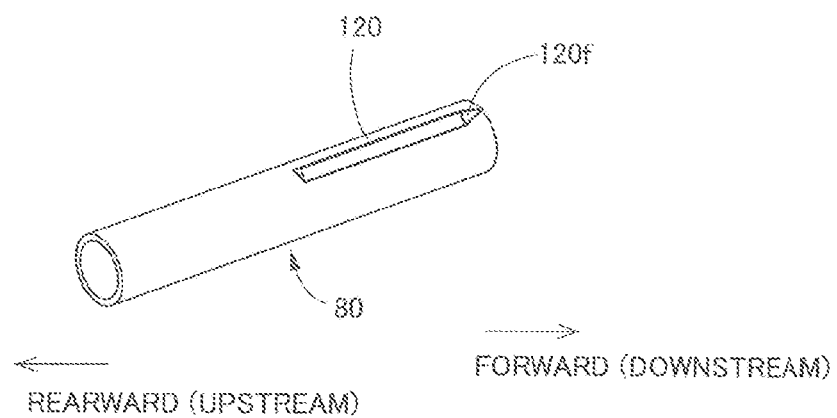
FIG. 8 is a perspective view conceptually illustrating an outer shaft of the steering shaft of the vehicle steering system.
Figure 9:
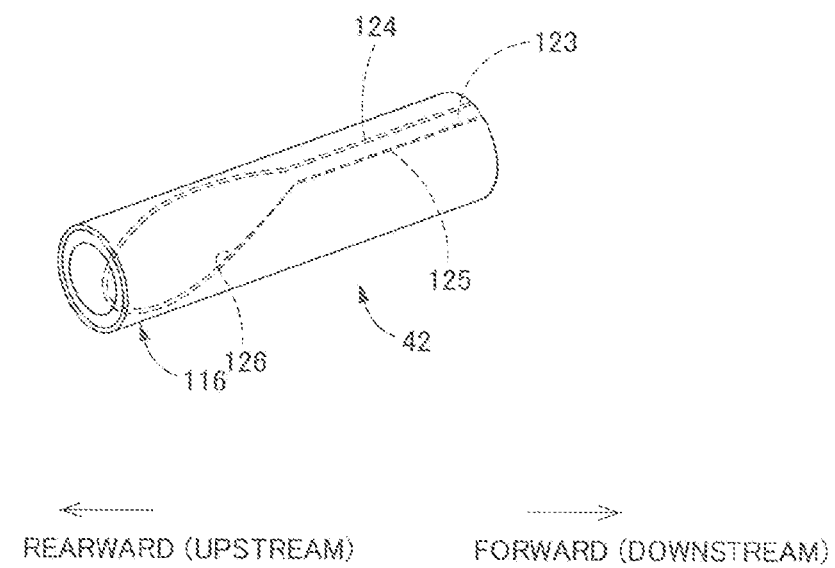
FIG. 9 is a perspective view conceptually illustrating an outer column of the column.

The neutral position holder 114 includes: a first protrusion 120 provided at the outer circumferential portion of the outer shaft 80 (i.e., a front end portion of the outer circumferential portion in the present embodiment) so as to protrude radially outwardly and extend in the axial direction of the outer shaft 80 as illustrated in FIG. 8; and a first recess 123 formed at the inner circumferential portion of the outer column 42 so as to extend in the axial direction of the outer column 42 as illustrated in FIG. 9.

A front end 120f of the first protrusion 120 is shaped such that a protruding amount in the radially outward direction and a width in the circumferential direction decrease toward a forward direction of the vehicle.

In a state in which the first protrusion 120 of the outer shaft 80 engages with the first recess 123 of the outer column 42, the phase of the outer shaft 80 coincides with a phase that corresponds to the neutral position of the steering wheel 2. The outer shaft 80 is held at this phase by the outer column 42 so as to be unrotatable relative to the outer column 42. Thus, the steering wheel 2 is prohibited from rotating from the neutral position and is locked.

The neutral position guide 116 is configured to guide rotation of the outer shaft 80 toward the phase thereof corresponding to the neutral position of the steering wheel 2. The neutral position guide 116 includes a curved guide surface 126, as a neutral position guide surface, provided in the outer column 42. The curved guide surface 126 is provided adjacent to the first recess 123 so as to be located upstream of the first recess 123, namely, so as to be located rearward of the first recess 123 in the vehicle.

The curved guide surface 126 extends over an entire circumference of the outer column 42 and is provided adjacent to a pair of holder surfaces 124, 125 located on opposite sides of the first recess 123, as illustrated in FIG. 9. One end of the curved guide surface 126 is contiguous to the holder surface 124, and the other end thereof is contiguous to the holder surface 125. The curved guide surface 126 is curved such that a portion thereof, which is spaced apart from the first recess 123 by a central angle of 180° in the circumferential direction of the outer column 42, protrudes the most upstream, namely, protrudes farthest from the first recess 123. Here, the central angle is an angle defined by the portion of the curved guide surface 126 in question and the first recess 123.

In the telescopic moving device 90, the worm gear 110 is rotated by the electric motor 96, and the worm wheel 112 is rotated. As a result, the drive rod 94 is moved in the front-rear direction, and the outer shaft 80 and the inner column 44 are moved in the front-rear direction, so that the position of the steering wheel 2 is changed in the front-rear direction.

Figure 19A:
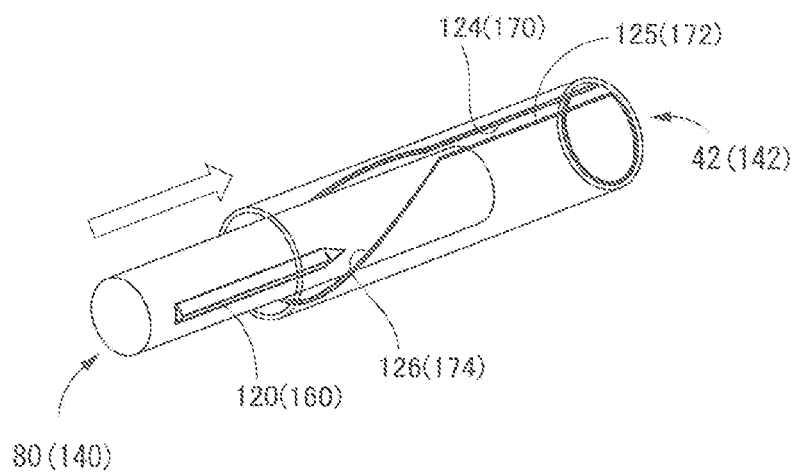
FIG. 19A is a view illustrating an operating state of a principal part of the vehicle steering system, specifically, a state before engagement of a protrusion and a guide (pre-operating state) with the assumption that components are transparent.
Figure 19B:
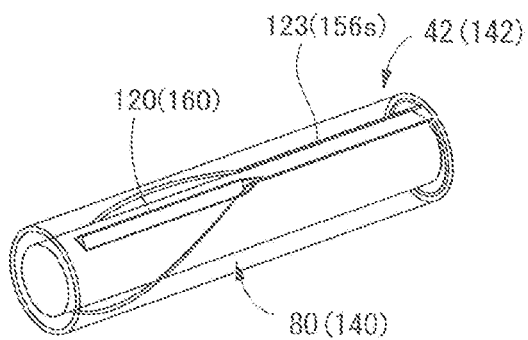
FIG. 19B is a view illustrating another operating state of the principal part of the vehicle steering system, specifically, a state in which the protrusion starts to engage with a recess (mid-operating state) with the assumption that the components are transparent.
Figure 20:
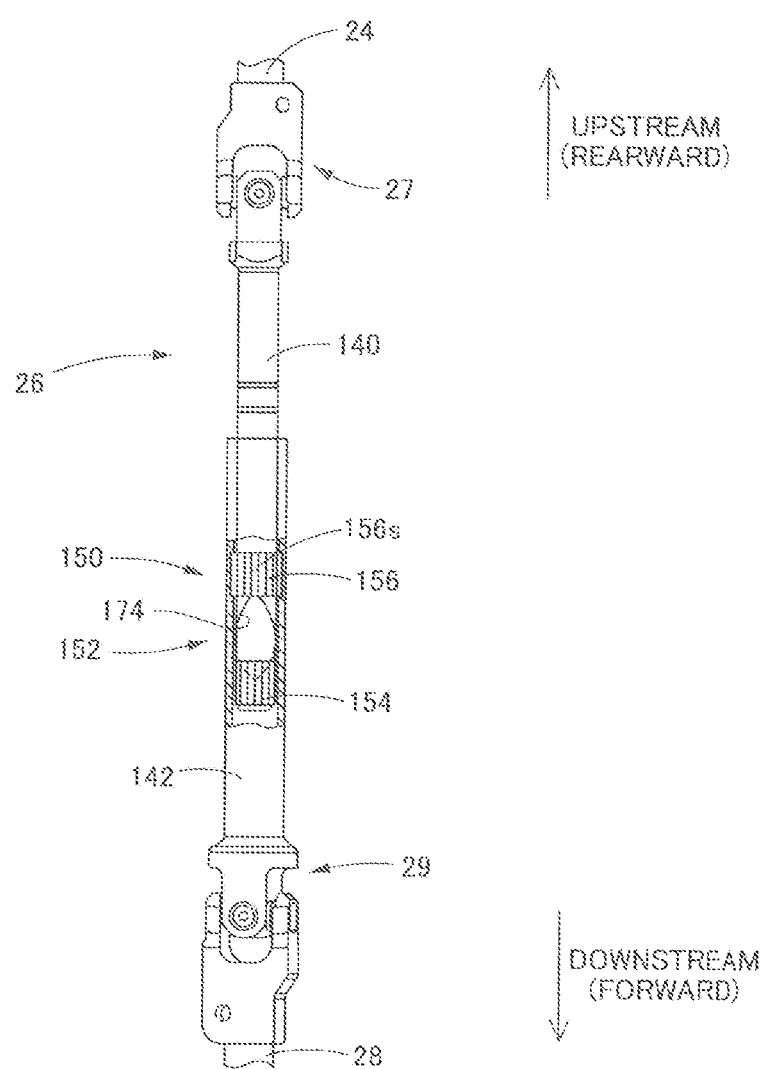
FIG. 20 is a conceptual view illustrating a state in which the intermediate shaft is contracted.

As illustrated in FIGS. 19A and 19B, when the outer shaft 80 is moved relative to the outer column 42 in the forward direction of the vehicle in a state in which the first protrusion 120 of the outer shaft 80 is in contact with any portion of the curved guide surface 126 of the outer column 42, the first protrusion 120 is moved along the curved guide surface 126, and the outer shaft 80 and the steering wheel 2 are rotated accordingly. Subsequently when the first protrusion 120 reaches any one of the holder surfaces 124, 125 and the outer shaft 80 is moved farther in the forward direction, the first protrusion 120 comes into engagement with the first recess 123. In the state in which the first protrusion 120 is in engagement with the first recess 123, the steering wheel 2 is located at the neutral position. In this state, the outer shaft 80 and the steering wheel 2 are held by the outer column 42 so as to be unrotatable about the axis relative to the outer column 42.

The front end 120f of the first protrusion 120 is shaped to have inclined surfaces, thus enabling the first protrusion 120 to be easily engaged with the first recess 123.

In the present embodiment, it is considered that the telescopic moving mechanism 89, the neutral position holder 114, the neutral position guide 116, etc., constitute a neutral position rotating and holding mechanism. It is further considered that the telescopic moving device 90, the neutral position holder 114, the neutral position guide 116, etc., constitute a neutral position rotating and holding device.

As illustrated in FIG. 3, the intermediate shaft 26 includes: an inner shaft 140, as one example of an upstream-side member, coupled to the steering shaft 24; and an outer shaft 142, as one example of a downstream-side member, coupled to the output rod 28. The outer shaft 142 is a cylindrical member extending in a longitudinal direction of the intermediate shaft 26. The inner shaft 140 that extends in the longitudinal direction is disposed inwardly of the outer shaft 142 so as to be movable relative to the outer shaft 142 in a direction of extension of the axis Lm of the inner shaft 140.

A rotation transmitter 150 is provided between an inner circumferential portion of the outer shaft 142 and an outer circumferential portion of the inner shaft 140. The rotation transmitter 150 is configured similarly to the rotation transmitter 84.

Figure 10:
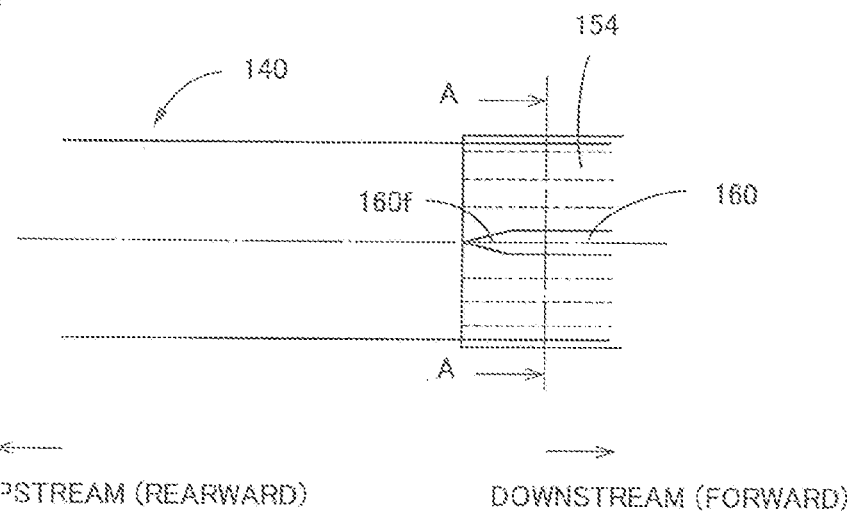
FIG. 10 is a front view conceptually illustrating an inner shaft of the intermediate shaft.
Figure 11:
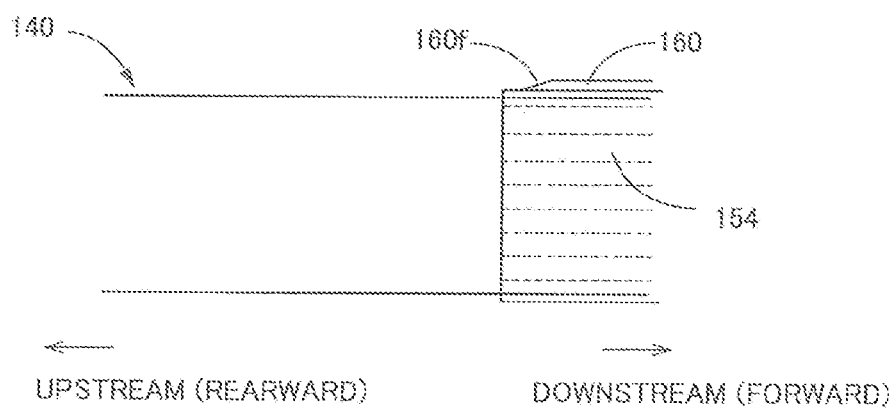
FIG. 11 is a side view conceptually illustrating the inner shaft.
Figure 12:
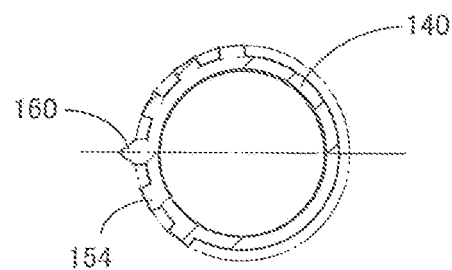
FIG. 12 is a cross-sectional view taken along A-A in FIG. 10.
Figure 13:
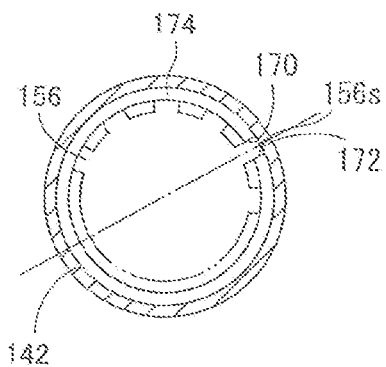
FIG. 13 is a cross-sectional view of an outer shaft of the intermediate shaft.
Figure 14:
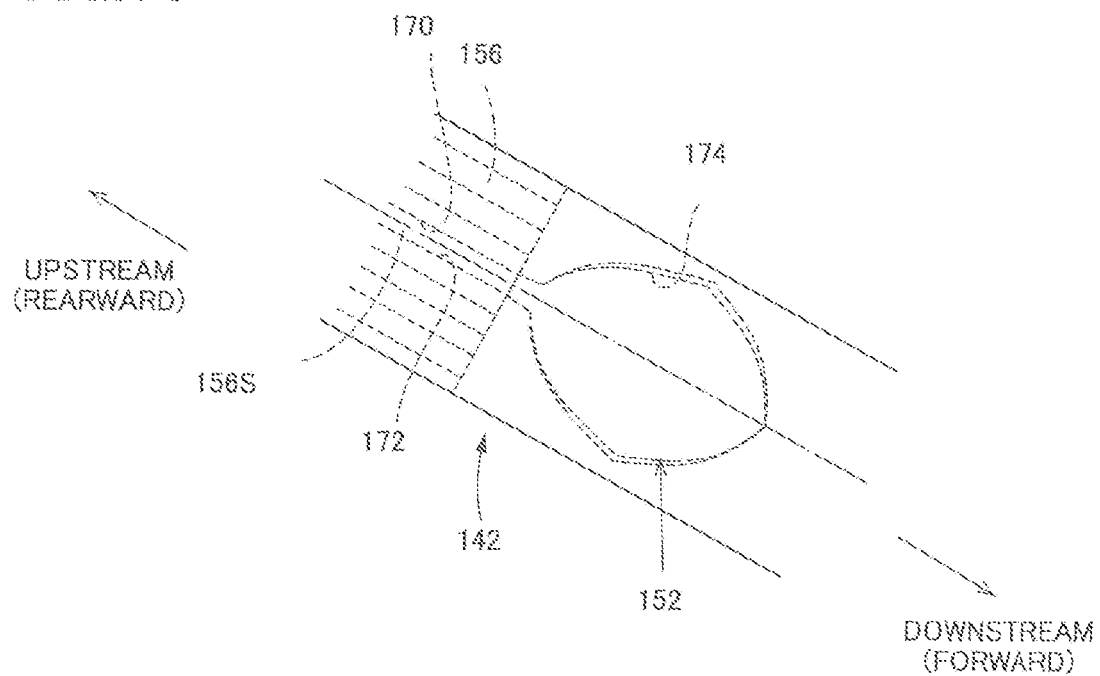
FIG. 14 is a front view conceptually illustrating the outer shaft of the intermediate shaft.
Figure 15:
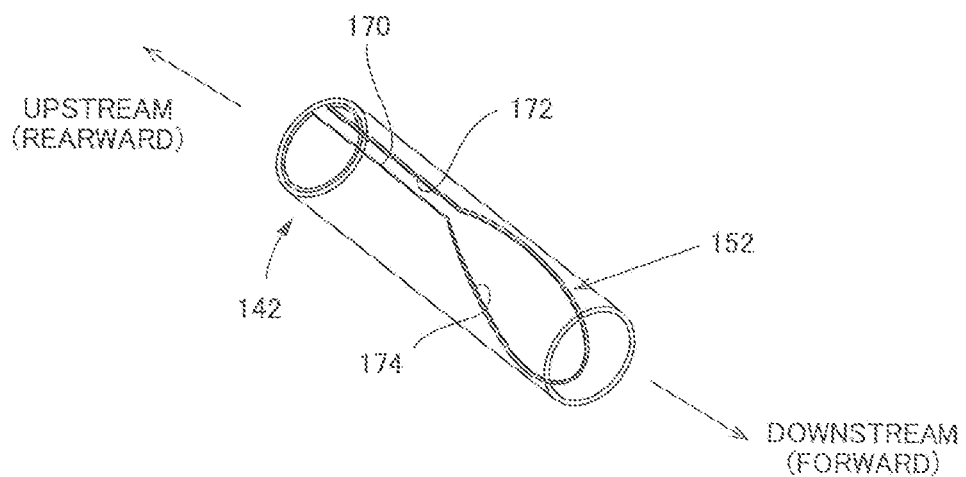
FIG. 15 is a perspective view conceptually illustrating the outer shaft of the intermediate shaft with the assumption that the outer shaft is transparent.

The rotation transmitter 150 includes: a plurality of protrusions 154 formed at the outer circumferential portion of the inner shaft 140 as illustrated in FIGS. 10-12; and a plurality of recesses 156 formed at the inner circumferential portion of the outer shaft 142 as illustrated in FIGS. 13-15. In a state in which the protrusions 154 and the recesses 156 are in serration engagement as illustrated in FIG. 3, the rotation transmitter 150 is in the transmission state and the coupling mechanism 7 is in the mechanically coupling state. In a state in which the protrusions 154 and the recesses 156 are not in engagement with each other as illustrated in FIG.

20, the rotation transmitter 150 is in the non-transmission state and the coupling mechanism 7 is in the mechanically decoupling state.

Even when the steering wheel 2 is rotated in the mechanically decoupling state of the coupling mechanism 7, the rotation of the steering wheel 2 is not transmitted to the gear box 22, and the front right and left wheels 4, 6 are not steered. Further, a reaction force from the road surface is not applied to the steering wheel 2, and the steering wheel 2 is free.

The vehicle steering system includes a return guide 152. When the driving state of the vehicle is switched from the automatic driving state to the manual driving state, the return guide 152 guides rotation of the outer shaft 142 for matching the phase (rotation angle) φ of the steering wheel 2 to a phase corresponding to the steering angle δ of the front right and left wheels 4, 6. The return guide 152 includes a curved guide surface 174. The curved guide surface 174 is shaped similarly to the curved guide surface 126 of the neutral position guide 116.

A third protrusion 160 is provided on the inner shaft 140. As illustrated in FIGS. 10-12, the third protrusion 160 is one of the plurality of protrusions 154. The third protrusion 160, however, has a protruding amount in the radially outward direction larger than that of other protrusions 154, and an upstream end 160f of the third protrusion 160 is shaped such that a protruding amount thereof in the radially outward direction and a width thereof in the circumferential direction decrease toward the upstream side.

As illustrated in FIGS. 13-15, a third recess 156s is provided in the outer shaft 142. The third recess 156s is one of the plurality of recesses 156. The third recess 156s, however, is recessed more deeply than other recesses 156 to such an extent that the third recess 156s is closer to the outer circumference of the outer shaft 142 than other recesses 156. A curved guide surface 174, as a return guide surface, is provided adjacent to a pair of holder surfaces 170, 172 located on opposite sides of the third recess 156s. The curved guide surface 174 is located downstream of the third recess 156s. The curved guide surface 174 extends over an entire circumferent of the outer shaft 142. The curved guide surface 174 is curved such that a portion thereof, which is spaced apart from the third recess 156s by a central angle of 180° in the circumferential direction of the outer shaft 142, protrudes the most downstream, namely, protrudes farthest from the third recess 156s. Here, the central angle is an angle defined by the portion of the curved guide surface 174 in question and the third recess 156s.

The recesses 156 are located more radially inward than the curved guide surface 174.

The neutral position guide 116 may be configured to include the curved guide surface 126 or may be configured to include the curved guide surface 126 and the pair of holder surfaces 124, 125. The return guide 152 may be configured to include the curved guide surface 174 or may be configured to include the curved guide surface 174 and the pair of holder surfaces 170, 172.

As illustrated in FIGS. 19A and 19B, in the mechanically decoupling state of the coupling mechanism 7 and the non-transmission state of the rotation transmitter 150, when the inner shaft 140 is moved relative to the outer shaft 142 in an axial direction in which the axis Lm extends toward the upstream side, namely, in a rearward direction of the vehicle in a state in which the third protrusion 160 of the inner shaft 140 is in contact with any portion of the curved guide surface 174, the third protrusion 160 is moved along the curved guide surface 174, whereby the inner shaft 140 is rotated. In this instance, the outer shaft 142 is at the phase corresponding to the steering angle δ of the front right and left wheels 4, 6. Thus, the phase of the inner shaft 140 matches to the phase of the outer shaft 142, so that the rotation angle φ of the steering wheel 2 can coincide with the phase corresponding to the steering angle δ.

When the inner shaft 140 is further moved, the third protrusion 160 comes into engagement with the third recess 156s. In this state, the protrusions 154 of the inner shaft 140 and the recesses 156 of the outer shaft 142 are brought into serration engagement, so that the rotation transmitter 150 is placed in the transmission state and the coupling mechanism 7 is placed in the mechanically coupling state.

The automatic steering device 8 steers the front right and left wheels 4, 6 by moving the rack bar 20 in the vehicle width direction in the automatic driving state. The automatic steering device 8 is provided on the rack bar 20. The automatic steering device 8 includes an electric motor 190 (FIG. 16) and a motion converting mechanism (not illustrated) for converting rotation of the electric motor 190 into a linear movement of the rack bar 20. In the automatic driving state, the electric motor 190 is controlled based on information from an environment-relating information obtainer 192 (FIG. 16), whereby the steering angle of the front right and left wheels 4, 6 is controlled. The environment-relating information obtainer 192 is configured to obtain information on an environment relating to the vehicle such as information on surrounding environment of the vehicle. The environment-relating information obtainer 192 includes a camera, radar, etc., and obtains a curved state of the road, objects in an area including at least surroundings of the vehicle based on images taken by the camera, radar, etc.

Figure 16:
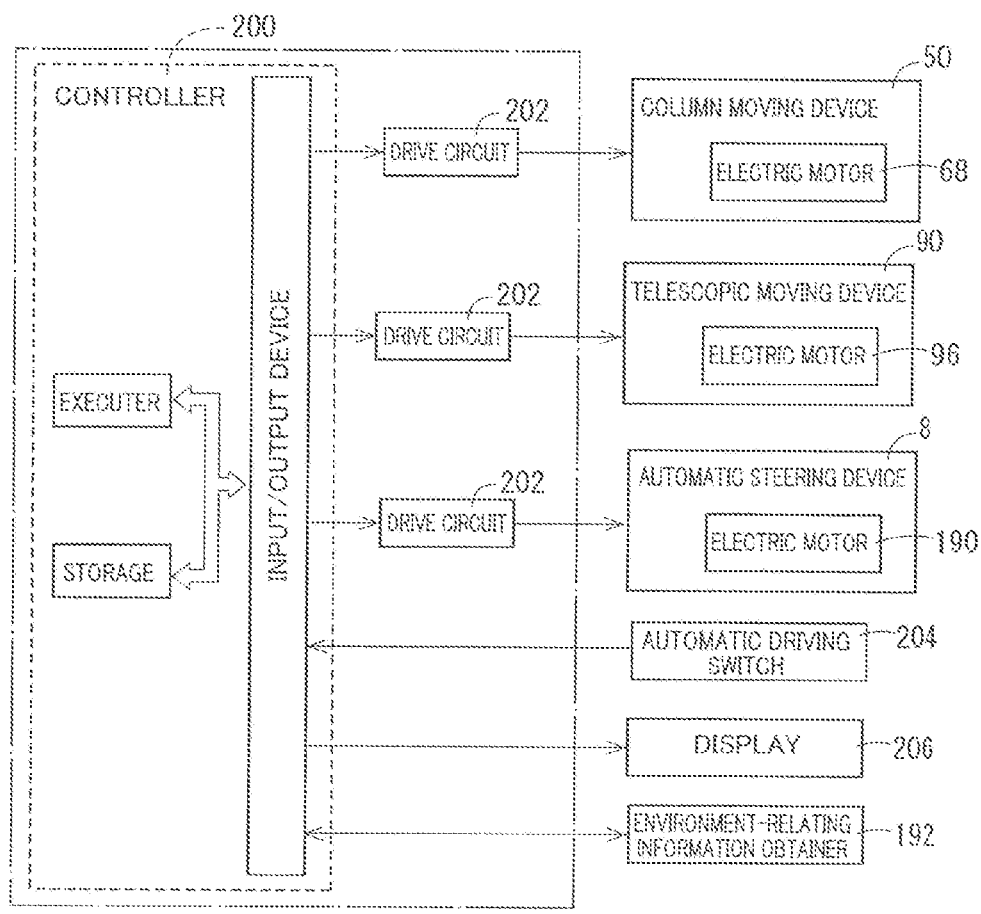
FIG. 16 is a block diagram conceptually illustrating a controller of the vehicle steering system and components therearound.

The vehicle steering system is controlled by a controller 200 constituted principally by a computer, as illustrated in FIG. 16. The controller 200 includes an executer, a storage, and an input/output device. There are connected, to the input/output device, the electric motor 68 as the drive source of the column moving device 50, the electric motor 96 as the drive source of the telescopic moving device 90, and the electric motor 190 as the drive source of the automatic steering device 8, via respective drive circuits 202. Further, the environment-relating information obtainer 192, an automatic driving switch 204, and the display 206 are also connected to the controller 200.

The automatic driving switch 204 is operated by the driver when the driving state of the vehicle is switched between the automatic driving state and the manual driving state. In an OFF state of the automatic driving switch 204, the driving state of the vehicle is the manual driving state. When the automatic driving switch 204 is turned on (ON), the driving state is switched to the automatic driving state. The driving state of the vehicle (the automatic driving state or the manual driving state), namely, the ON/OFF state of the automatic driving switch 204, is indicated on a display 206.

Figure 17:
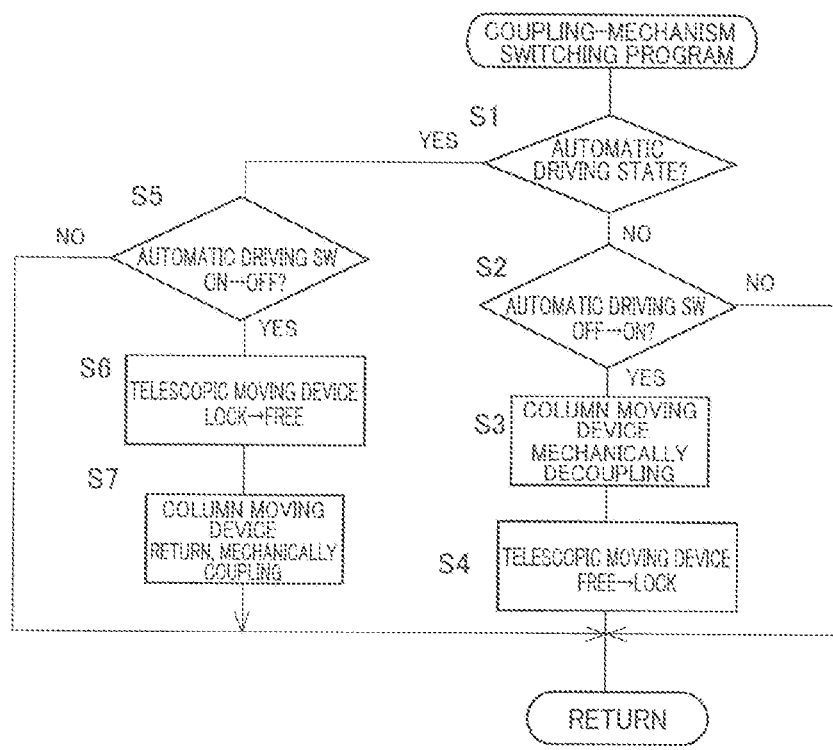
FIG. 17 is a flowchart representing a coupling-mechanism switching program stored in a storage of the controller.

In the thus constructed vehicle steering system, a coupling-mechanism switching program represented by a flowchart of FIG. 17 is executed at a predetermined time pitch.

At Step 1, it is determined whether the driving state of the vehicle is the automatic driving state. Step 1 will be hereinafter abbreviated as "S1", and other steps will be similarly abbreviated. When a negative determination (NO) is made at S1, the control flow proceeds to S2 to determine whether the automatic driving switch 204 is switched from OFF to ON. When a negative determination (NO) is made at S2, S3 and S4 are skipped. In the manual driving state, the vehicle steering system is in a state illustrated in FIG. 18A. In the state of FIG. 18A, the steering wheel 2 is located at a first position that is the rearmost position, and the steering wheel 2 and the front right and left wheels 4, 6 are mechanically coupled. Thus, the coupling mechanism 7 is in the mechanically coupling state. In this state, the operation torque applied to the steering wheel 2 is mechanically transmitted to the front right and left wheels 4, 6, whereby the front right and left wheels 4, 6 are steered.

When an affirmative determination (YES) is made at S2, the driving state of the vehicle is switched from the manual driving state to the automatic driving state.

At S3, the column 30 is moved in the forward direction by the column moving actuator 54, so that the position of the steering wheel 2 is changed toward the forward direction. Thus, the steering wheel 2 is located at a second position. As illustrated in FIG. 18B, the movement of the column 30 in the forward direction causes a distance D between the universal joints 27, 29 to be reduced from a distance D1 to a distance D2 (D2<D1), whereby the intermediate shaft 26 contracts. The inner shaft 140 is moved downstream relative to the outer shaft 142, and the serration engagement of the rotation transmitter 150 is cancelled, so that the rotation transmitter 150 is switched to the non-transmission state, and the coupling mechanism 7 is switched to the mechanically decoupling state. This execution is referred to as a mechanically decoupling step.

In the mechanically decoupling state of the coupling mechanism 7, the front right and left wheels 4, 6 are steered by the automatic steering device 8. The electric motor 190 of the automatic steering device 8 is controlled based on the information obtained by the environment-relating information obtainer 192. Because the steering wheel 2 does not receive a torque from the road surface, the steering wheel 2 is freely rotatable At S4, the steering shaft 24 and the column 30 are contracted by the telescopic actuator 95 as illustrated in FIG. 18C. The outer shaft 80 is moved in the forward direction of the vehicle relative to the outer column 42, and the first protrusion 120 reaches the curved guide surface 126. In a state in which the first protrusion 120 is in contact with the curved guide surface 126, the outer shaft 80 is moved in the forward direction of the vehicle relative to the outer column 42, so that rotation of the outer shaft 80 to the phase corresponding to the neutral position of the steering wheel 2 is guided. This execution is referred to as a neutral position guiding step. In the neutral position guiding step, the reaction force from the road surface does not act on the steering wheel 2, thus enabling the outer shaft 80 to be easily rotated.

When the outer shaft 80 is further moved in the forward direction relative to the outer column 42, the first protrusion 120 comes into engagement with the first recess 123 and is held at the position. The steering wheel 2 is locked. As illustrated in FIG. 7B, the steering wheel 2 is accommodated in the storage recess 12s of the control panel 12. The position of the steering wheel 2 in this state is a third position. This execution is referred to as a neutral position holding step.

As described above, in the mechanically decoupling state of the coupling mechanism 7, namely, in the automatic driving state of the vehicle, the steering wheel 2 is accommodated in the storage recess 12s, and the driver is unlikely to touch the steering wheel 2. Further, the steering wheel 2 and the front right and left wheels 4, 6 are disconnected from each other. Accordingly, even if the driver applies a force to the steering wheel 2, steering of the front right and left wheels 4, 6 is not hindered. Further, the space in the vehicle around the driver's seat can be increased. According to the present embodiment, the vehicle cabin comfort in the automatic driving state can be enhanced.

If the coupling mechanism 7 is in the mechanically coupling state in the automatic driving state, the steering wheel 2 is rotated in accordance with steering of the front right and left wheels 4, 6. In this case, the storage recess 12s formed in the control panel 12 needs to have a generally circular shape in front view. In the present embodiment, in contrast, the coupling mechanism 7 is in the mechanically decoupling state in the automatic driving state, and the steering wheel 2 is not rotated when the front right and left wheels 4, 6 are steered. This enables the storage recess 12s formed in the control panel 12 to have a generally rectangular shape. Thus, the space for storing the steering wheel in the control panel 12 can be made smaller, resulting in an enhanced degree of freedom in design.

In the automatic driving state, an affirmative determination (YES) is made at S1, and the control flow proceeds to S5 at which it is determined whether the automatic driving switch 204 is switched from ON to OFF. When an affirmative determination (YES) is made at S5, the telescopic actuator 95 is activated at S6 to move the outer shaft 80 relative to the outer column 42 in the rearward direction of the vehicle, as illustrated in FIG. 18B. The first protrusion 120 of the outer shaft 80 is disengaged from the first recess 123 of the outer column 42, so that the steering wheel 2 becomes rotatable about the axis L and is accordingly free. This execution is referred to as a lock canceling step.

At S7, the column moving actuator 54 is activated so as to move the column 30 in the rearward direction, so that the position of the steering wheel 2 is changed toward the rearward direction, and the intermediate shaft 26 is accordingly expanded. The inner shaft 140 is moved upstream relative to the outer shaft 142. The inner shaft 140 is moved in the direction in which the axis Lm extends while being rotated owing to engagement of the third protrusion 160 of the inner shaft 140 and the curved guide surface 174 of the outer shaft 142. The phase of the inner shaft 140 conforms to the phase of the outer shaft 142, namely, the phase corresponding to the steering angle δ of the front right and left wheels 4, 6, whereby the phase of the steering wheel 2 conforms to the phase corresponding to the steering angle δ. This execution is referred to as a return guiding step.

When the inner shaft 140 is further moved upstream relative to the outer shaft 142, the third protrusion 160 reaches the third recess 156s and is held by the third recess 156s. The protrusions 154 of the inner shaft 140 and the recesses 156 of the outer shaft 142 are brought into serration engagement, so that the rotation transmitter 150 is switched from the non-transmission state to the transmission state. The coupling mechanism 7 is switched to the mechanically coupling state. Thus, the driving state of the vehicle is switched to the manual driving state. This execution is referred to as a mechanical coupling step.

When the driving state of the vehicle is returned to the manual driving state as described above, the phase of the steering wheel 2 conforms to the phase corresponding to the steering angle δ of the right and left wheels 4, 6. Thus, the present configuration enables the driver to be less likely to feel unnatural when the driving state of the vehicle is returned to the manual driving state.

The rotation transmitter 84 between the outer shaft 80 and the inner shaft 82 may be switched to the non-transmission state at S4. In this case, the rotation transmitter 84 may be switched to the transmission state at S6. However, the rotation transmitter 84, the neutral position guide 116, and the neutral position holder 114 may be designed such that the rotation transmitter 84 is kept in the transmission state at S4.

In the present embodiment, the coupling mechanism 7 is constituted by the steering shaft 24, the intermediate shaft 26, the rack bar 20, the gear box 22, the tie rods 18, 19, the knuckle arms 16, 17, the rotation transmitters 84, 150, etc. An operation-position changing mechanism is constituted by at least one of the column moving mechanism 60 and the telescopic moving mechanism 89. An operation-position changing device is constituted by at least one of the column moving device 50 and the telescopic moving device 90. An operation-position changing actuator is constituted by at least one of the column moving actuator 54 and the telescopic actuator 95. A switcher is constituted by a portion of the controller 200 that stores and executes S3 and S7 of the flowchart of FIG. 17, for instance.

In the embodiment illustrated above, the neutral position guide 116 and the return guide 152 are provided for the inner circumferential portion of the radially outward cylindrical member. The neutral position guide 116 and the return guide 152 may be provided for the radially inward member. In this case, a second protrusion (that will be described) and the third protrusion are provided for an inner circumferential portion of the radially outward cylindrical member so as to protrude radially inward.

Second Embodiment

In the embodiment illustrated above, the return guide 152 is provided for the intermediate shaft 26. The return guide 152 may be provided for the steering shaft 24, as illustrated in a second embodiment of FIGS. 21A-21D.

Figure 21A:
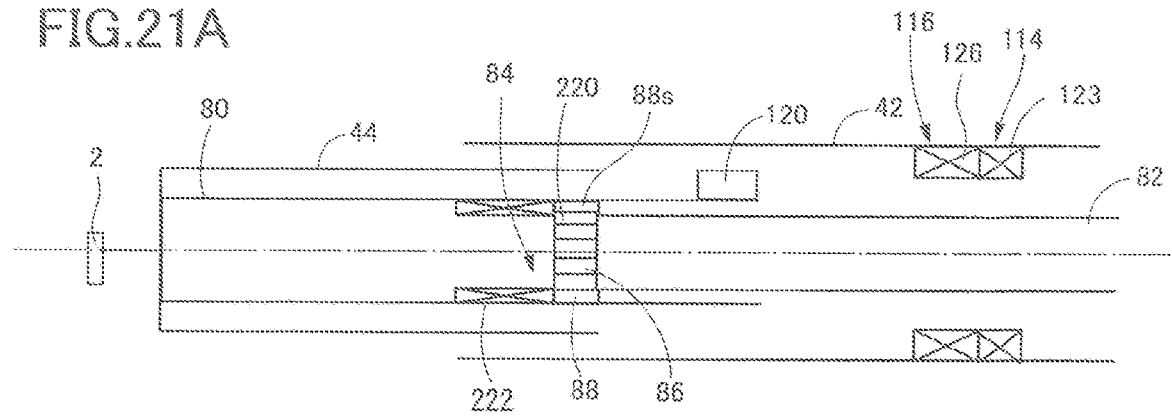
FIG. 21A is an operation diagram conceptually illustrating a column and components therearound in a vehicle steering system according to a second embodiment, when the driving state of the vehicle is the manual driving state.

As illustrated in FIG. 21A, a third protrusion 220 is provided for one of the inner circumferential portion of the outer shaft 80 and the outer circumferential portion of the inner shaft 82. (In the present embodiment, the third protrusion 220 is provided for the inner shaft 82.) A return guide 222 is provided for the inner circumferential portion of the outer shaft 80. The third protrusion 220 may be one of the plurality of protrusions 86. The return guide 222 is provided upstream of and adjacent to a third recess 88s that is one of the plurality of recesses 88 of the rotation transmitter 84. In this case, a stroke of the position of the steering wheel 2, namely, a distance over which the steering wheel 2 is moved, may be made large.

Figure 21B:
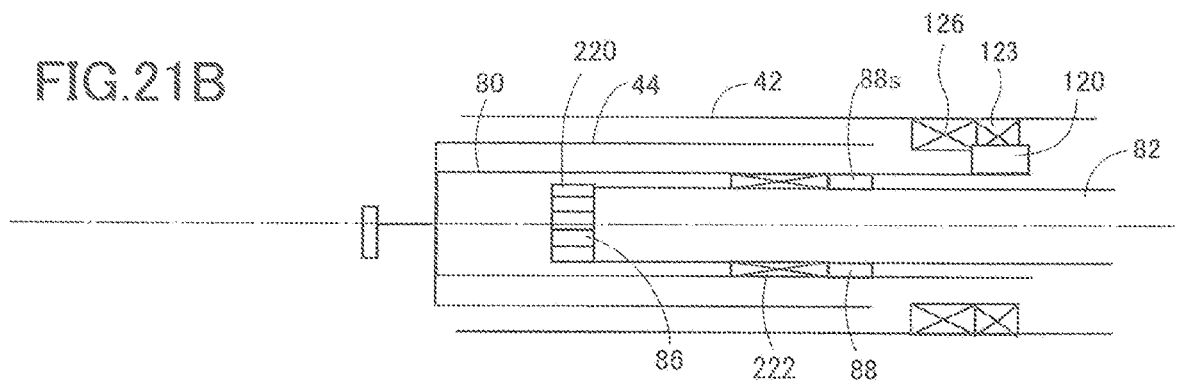
FIG. 21B is an operation diagram conceptually illustrating the column and the components therearound in the vehicle steering system according to the second embodiment, when the driving state of the vehicle is the automatic driving state.

In the present embodiment, the rotation transmitter 84 is in the transmission state as illustrated in FIG. 21A when the driving state of the vehicle is the manual driving state. For switching the driving state of the vehicle to the automatic driving state, the outer shaft 80 and the inner column 44 are moved forward relative to the inner shaft 82 and the outer column 42. As illustrated in FIG. 21B, the serration engagement of the rotation transmitter 84 is canceled, and the rotation of the outer shaft 80 is guided by the neutral position guide 116 to the phase corresponding to the neutral position of the steering wheel 2, the first protrusion 120 comes into engagement with the first recess 123, and the steering wheel 2 is held at the neutral position by the neutral position holder 114. The rotation transmitter 84 is placed in the non-transmission state, and the coupling mechanism is placed in the mechanically decoupling state. Thus, the driving state of the vehicle is switched to the automatic driving state.

Figure 21C:
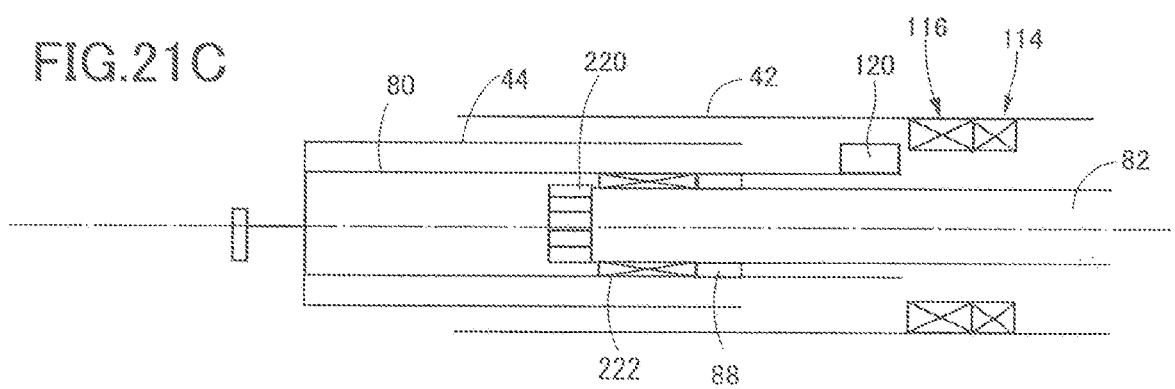
FIG. 21C is an operation diagram conceptually illustrating the column and the components therearound in the vehicle steering system according to the second embodiment, in the midst of switching from the automatic driving state to the manual driving state.
Figure 21D:
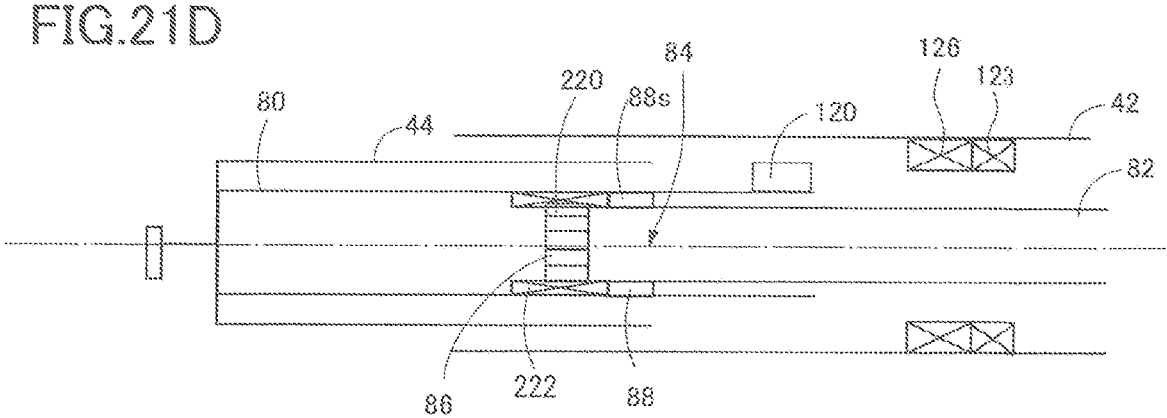
FIG. 21D is another operation diagram conceptually illustrating the column and the components therearound in the vehicle steering system according to the second embodiment, in the midst of switching from the automatic driving state to the manual driving state.

For switching the driving state of the vehicle from the automatic driving state to the manual driving state, as illustrated in FIG. 21C, the outer shaft 80 is moved relative to the outer column 42 toward the rearward direction of the vehicle, so that the first protrusion 120 is disengaged from the first recess 123 and the holding of the steering wheel 2 by the neutral position holder 114 is canceled. Thus, the steering wheel 2 becomes free. Subsequently, as illustrated in FIG. 21D, the outer shaft 80 is moved rearward relative to the inner shaft 82 in a state in which the third protrusion 220 is in contact with the return guide 222. The phase of the outer shaft 80 conforms to the phase of the inner shaft 82, and the phase of the steering wheel 2 conforms to the phase corresponding to the steering angle of the front right and left wheels 4, 6. Thereafter, the protrusions 86 and the recesses 88 are brought into serration engagement, so that the rotation transmitter 84 is placed in the transmission state and the coupling mechanism is placed in the mechanically coupling state.

In the present embodiment, the column moving device 50 is unnecessary, thus contributing to a reduction in the cost. It is noted that the outer shaft 80 corresponds to the upstream-side member and the inner shaft 82 corresponds to the downstream-side member.

The neutral position holder 114 may be provided for the intermediate shaft 26. The neutral position holder 114 may include a plurality of the first protrusions and a plurality of the first recesses.

The column moving device 50 and the telescopic moving device 90 are not essential. In a case where: the column 30 is supported by the vehicle body 32 via the link mechanism 60; and the outer shaft 80, the inner shaft 82, etc., include the telescopic moving mechanism 89, the position of the steering wheel 2 can be changed by the driver to thereby move the column 30.

The steering wheel may have any shape. The steering wheel may have a generally circular shape or may be shaped like a lever as long as the steering wheel is rotatable about the axis L. It is to be understood that the present disclosure may be changed and modified based on the knowledge of those skilled in the art.

CLAIMABLE INVENTIONS (1) A vehicle steering system provided for a vehicle whose driving state is switchable between a manual driving state and an automatic driving state, the vehicle steering system including a coupling mechanism configured to couple a steering operation member operated by a driver and at least one steerable wheel of the vehicle, wherein, when the driving state of the vehicle is switched from the manual driving state to the automatic driving state, the coupling mechanism is switched from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other. The coupling mechanism may be switched from the mechanically coupling state to the mechanically decoupling state by driving an actuator or by an operation of the driver.

(2) The vehicle steering system according to the form (1), comprising an operation-position changing mechanism capable of changing a position of the steering operation member in a front-rear direction of the vehicle, wherein the coupling mechanism is switched from the mechanically coupling state to the mechanically decoupling state in accordance with a change of the position of the steering operation member toward a forward direction of the vehicle by the operation-position changing mechanism.

(3) The vehicle steering system according to the form (1) or (2), comprising: an operation-position changing actuator configured to change a position of the steering operation member in a front-rear direction of the vehicle; and a controller configured to control the operation-position changing actuator so as to change the position of the steering operation member, wherein the controller includes a switcher configured to switch the coupling mechanism between the mechanically coupling state and the mechanically decoupling state by changing the position of the steering operation member owing to control of the operation-position changing actuator. The operation-position changing actuator includes at least one of the column moving actuator and the telescopic actuator. The operation-position changing mechanism includes at least one of the link mechanism as the column moving mechanism and a telescopic moving mechanism.

(4) The vehicle steering system according to any one of the forms (1) through (3), comprising an upstream-side member and a downstream-side member provided between the steering operation member and a steering gear box and movable relative to each other, wherein the coupling mechanism includes a rotation transmitter provided between the upstream-side member and the downstream-side member, the rotation transmitter being switchable between a transmission state in which rotation of the upstream-side member and rotation of the downstream-side member are transmittable therebetween and a non-transmission state in which the rotation of the upstream-side member and the rotation of the downstream-side member are untransmittable therebetween, and wherein the rotation transmitter is switched from the transmission state to the non-transmission state by a relative movement of the upstream-side member and the downstream-side member caused by a change of a position of the steering operation member toward a forward direction of the vehicle.

(5) The vehicle steering system according to the form (4), wherein the rotation transmitter includes at least one protrusion provided for one of the upstream-side member and the downstream-side member and at least one recess provided for the other of the upstream-side member and the downstream-side member, and wherein the rotation transmitter is switched from the transmission state in which the at least one protrusion and the at least one recess are in engagement with each other to the non-transmission state in which the at least one protrusion and the at least one recess are not in engagement with each other, by the relative movement of the upstream-side member and the downstream-side member caused by the change of the position of the steering operation member toward the forward direction of the vehicle. In the transmission state of the rotation transmitter, the at least one protrusion and the at least one recess are in spline engagement or in serration engagement with each other.

(6) The vehicle steering system according to the form (4) or (5), comprising: a steering shaft coupled to the steering operation member and extending in an axial direction in which an axis of the steering shaft extends; a column holding the steering shaft such that the steering shaft is rotatable about the axis relative to the column and is movable in the axial direction integrally with the column; an intermediate shaft disposed between the steering shaft and the steering gear box and including the upstream-side member and the downstream-side member; and a column moving mechanism capable of moving the column in a front-rear direction of the vehicle, wherein the rotation transmitter is switched from the transmission state to the non-transmission state by a relative movement of the upstream-side member and the downstream-side member caused by a movement of the column toward the forward direction of the vehicle. The column may be movable by the actuator or by the driver.

(7) The vehicle steering system according to the form (6), comprising a column moving actuator disposed between a body of the vehicle and the column and configured to move the column in the front-rear direction of the vehicle.

(8) The vehicle steering system according to any one of the forms (1) through (7), comprising a neutral position holder configured to hold the steering operation member at a neutral position in the mechanically decoupling state of the coupling mechanism. In the mechanically decoupling state of the coupling mechanism, the steering operation member is held by the neutral position holder such that the steering operation member is prohibited from rotating from the neutral position.

(9) The vehicle steering system according to the form (8), comprising: a steering shaft coupled to the steering operation member such that the steering shaft is rotatable about an axis thereof integrally with the steering operation member; and a column holding the steering shaft such that the steering shaft is rotatable about the axis, the column being held by a body of the vehicle so as to be unrotatable about the axis relative to the body of the vehicle, wherein the neutral position holder includes at least one first protrusion provided for one of an inside portion of the column and an outer circumferential portion of the steering shaft and at least one first recess provided for the other of the inside portion of the column and the outer circumferential portion of the steering shaft, and wherein, when the steering operation member is located at the neutral position, the neutral position holder holds the steering shaft such that the steering shaft is prohibited from rotating about the axis relative to the column, in a state in which the at least one first protrusion and the at least one first recess are in engagement with each other. The engagement of the at least one first protrusion and the at least one first recess prohibits the steering shaft from rotating relative to the column, whereby the steering operation member is prohibited from rotating from the neutral position.

(10) The vehicle steering system according to any one of the forms (1) through (9), comprising a neutral position guide configured to guide, in the mechanically decoupling state of the coupling mechanism, rotation of the steering operation member toward a neutral position in accordance with a change of a position of the steering operation member toward a forward direction of the vehicle.

(11) The vehicle steering system according to the form (10), comprising: a steering shaft coupled to the steering operation member such that the steering shaft is rotatable about an axis thereof integrally with the steering operation member; and a column holding the steering shaft such that the steering shaft is rotatable about the axis, the column being held by a body of the vehicle so as to be unrotatable about the axis relative to the body of the vehicle, wherein a second protrusion is provided for one of an inside portion of the column and an outer circumferential portion of the steering shaft, and wherein the neutral position guide is provided for the other of the inside portion of the column and the outer circumferential portion of the steering shaft, and wherein the steering shaft is moved relative to the column in the forward direction of the vehicle in a state in which the second protrusion is in contact with the neutral position guide, so that the neutral position guide guides rotation of the steering shaft about the axis toward a phase corresponding to the neutral position of the steering operation member. The first protrusion and the second protrusion may be common to or different from each other.

(12) The vehicle steering system according to the form (10) or (11), comprising: a steering shaft coupled to the steering operation member and extending in an axial direction in which an axis of the steering shaft extends; a column holding the steering shaft, the column being held by a body of the vehicle so as to be unrotatable about the axis relative to the body of the vehicle; and a neutral position holder configured to hold the steering operation member at the neutral position, wherein the neutral position holder includes at least one first protrusion provided for one of an inside portion of the column and an outer circumferential portion of the steering shaft and at least one first recess provided for the other of the inside portion of the column and the outer circumferential portion of the steering shaft, wherein the neutral position holder holds the steering operation member such that the steering operation member is unrotatable about the axis from the neutral position by engagement of the at least one first protrusion and the at least one first recess, and wherein the neutral position guide includes a neutral position guide surface provided adjacent to a second recess that is one of the at least one first recess, the neutral position guide surface being curved such that a portion thereof, which is spaced apart from the second recess by 180° in a circumferential direction of the other, protrudes farthest in the axial direction. The second protrusion, which is one of the at least one first protrusion, is moved along the curved guide surface of the neutral position guide, so that the steering shaft is rotated to a phase corresponding to the neutral position of the steering operation member. Further, the second protrusion thereafter comes into engagement with the second recess, so that the steering shaft is held at the phase corresponding to the neutral position of the steering operation member.

(13) The vehicle steering system according to any one of the forms (6), (7), (9), (11), and (12), wherein the steering shaft includes: a cylindrical outer shaft provided so as to be rotatable about an axis thereof integrally with the steering operation member and extending in a longitudinal direction of the steering shaft; and an inner shaft located inwardly of the outer shaft, wherein the column includes: an inner column holding the outer shaft such that the outer shaft is rotatable about the axis relative to the inner column and immovable relative to the inner column in an axial direction in which the axis extends; and an outer column holding the inner shaft such that the inner shaft is rotatable about the axis relative to the outer column and immovable relative to the outer column in the axial direction, and wherein the vehicle steering system includes a telescopic position changing mechanism capable of changing a position of the steering operation member in the front-rear direction of the vehicle by a relative movement, in the axial direction, of: the outer shaft and the inner column; and the inner shaft and the outer column.

(14) The vehicle steering system according to the form (13), comprising a telescopic actuator configured to cause the relative movement, in the axial direction, of: the outer shaft and the inner column; and the inner shaft and the outer column.

(15) The vehicle steering system according to any one of the forms (1) through (14), comprising a neutral position rotating and holding device configured to rotate the steering operation member to the neutral position and hold the steering operation member at the neutral position in the mechanically decoupling state of the coupling mechanism. It may be considered that the neutral position rotating and holding device includes the telescopic position changing device including the telescopic actuator, the neutral position holder, the neutral position guide, etc.

(16) The vehicle steering system according to any one of the forms (1) through (15), comprising a return guide configured to guide, in the mechanically decoupling state of the coupling mechanism, rotation of the steering operation member toward a phase corresponding to a steering angle of the at least one steerable wheel in accordance with a change of a position of the steering operation member toward a rearward direction of the vehicle.

(17) The vehicle steering system according to the form (16), comprising: an upstream-side member and a downstream-side member disposed between the steering operation member and a steering gear box and movable relative to each other; and a third protrusion provided for one of the upstream-side member and the downstream-side member, wherein the return guide is provided for the other of the upstream-side member and the downstream-side member, and wherein the upstream-side member and the downstream-side member are moved relative to each other in the axial direction in accordance with the change of the position of the steering operation member toward the rearward direction of the vehicle in a state in which the third protrusion is in contact with the return guide, so that the return guide guides rotation of the upstream-side member toward a phase corresponding to a phase of the downstream-side member. The return guide may be provided adjacent to the recess of the rotation transmitter.

(18) The vehicle steering system according to the form (17), comprising a rotation transmitter including: at least one protrusion provided for one of the upstream-side member and the downstream-side member; and at least one recess provided for the other of the upstream-side member and the downstream-side member, the rotation transmitter being switchable, owing to the at least one protrusion and the at least one recess, between a transmission state in which rotation of the upstream-side member and rotation of the downstream-side member are transmittable therebetween and a non-transmission state in which the rotation of the upstream-side member and the rotation of the downstream-side member are untransmittable therebetween, wherein one of the at least one protrusion is the third protrusion, and wherein the return guide includes a return guide surface provided adjacent to a third recess that is one of the at least one recess provided for the other of the upstream-side member and the downstream-side member, the return guide surface being curved such that a portion thereof, which is spaced apart from the third recess by 180° in a circumferential direction of the other, is located most distant from the third recess. The upstream-side member is rotated by the return guide by the relative movement of the upstream-side member and the downstream-side member in the axial direction, so that the phase of the upstream-side member conforms to the phase of the downstream-side member. The upstream-side member and the downstream-side member are further moved relative to each other, so that the rotation transmitter is switched from the non-transmission state to the transmission state. As a result, the coupling mechanism is switched from the mechanically decoupling state to the mechanically coupling state.

(19) The vehicle steering system according to any one of the forms (1) through (17), comprising a return device configured to rotate, in the mechanically decoupling state of the coupling mechanism, the steering operation member toward a phase corresponding to a steering angle of the at least one steerable wheel and to switch the coupling mechanism to the mechanically coupling state. The return device includes the column moving device equipped with the column moving actuator, the third protrusion, the return guide, the third recess, etc.

(20) A coupling-mechanism switching method executed in a vehicle steering system provided for a vehicle whose driving state is switchable between a manual driving state and an automatic driving state and including a coupling mechanism configured to couple a steering operation member operable by a driver and at least one steerable wheel of the vehicle, wherein the method is executed when the driving state of the vehicle is switched from the manual driving state to the automatic driving state, and wherein the method comprises a mechanically decoupling step of switching the coupling mechanism from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other, by changing a position of the steering operation member toward a forward direction of the vehicle. The coupling-mechanism switching method is executable in the vehicle steering system described in any one of the forms (1) through (19).

(21) The coupling-mechanism switching method according to the form (20), comprising a neutral position guiding step of rotating the steering operation member toward a neutral position by changing the position of the steering operation member farther in the forward direction of the vehicle, the neutral position guiding step being executed after the mechanically decoupling step.

(22) The coupling-mechanism switching method according to the form (21), comprising a neutral position holding step of unrotatably holding the steering operation member at the neutral position in the mechanically decoupling state of the coupling mechanism, the neutral position holding step being executed after the neutral position guiding step.

(23) The coupling-mechanism switching method according to the form (22), comprising: a lock canceling step of canceling holding of the steering operation member at the neutral position by changing the position of the steering operation member in a rearward direction of the vehicle, so as to place the steering operation member in a free state in which the steering operation member is allowed to rotate from the neutral position; a return guiding step of guiding rotation of the steering operation member toward a phase corresponding to a steering angle of the at least one steerable wheel by changing the position of the steering operation member farther in the rearward direction of the vehicle; and a mechanically coupling step of switching the coupling mechanism from the mechanically decoupling state to the mechanically coupling state by changing the position of the steering operation member much farther in the rearward direction of the vehicle.

What is claimed is:

1. A vehicle steering system provided for a vehicle whose driving state is switchable between a manual driving state and an automatic driving state, the vehicle steering system including a coupling mechanism configured to couple a steering operation member operated by a driver and at least one steerable wheel of the vehicle,
wherein, when the driving state of the vehicle is switched from the manual driving state to the automatic driving state, the coupling mechanism is switched from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other,
wherein the vehicle steering system includes:
a neutral position holder configured to hold the steering operation member at a neutral position in the mechanically decoupling state of the coupling mechanism;
a steering shaft coupled to the steering operation member such that the steering shaft is rotatable about an axis thereof integrally with the steering operation member; and
a column holding the steering shaft such that the steering shaft is rotatable about the axis, the column being held by a body of the vehicle so as to be unrotatable about the axis relative to the body of the vehicle,
wherein the neutral position holder includes at least one first protrusion provided for one of an inside portion of the column and an outer circumferential portion of the steering shaft and at least one first recess provided for the other of the inside portion of the column and the outer circumferential portion of the steering shaft, and
wherein, when the steering operation member is located at the neutral position, the neutral position holder holds the steering shaft such that the steering shaft is prohibited from rotating about the axis relative to the column, in a state in which the at least one first protrusion and the at least one first recess are in engagement with each other.

2. The vehicle steering system according to claim 1, comprising an upstream-side member and a downstream-side member provided between the steering operation member and a steering gear box and movable relative to each other,
wherein the coupling mechanism includes a rotation transmitter provided between the upstream-side member and the downstream-side member, the rotation transmitter being switchable between a transmission state in which rotation of the upstream-side member and rotation of the downstream-side member are transmittable therebetween and a non-transmission state in which the rotation of the upstream-side member and the rotation of the downstream-side member are untransmittable therebetween, and
wherein the rotation transmitter is switched from the transmission state to the non-transmission state by a relative movement of the upstream-side member and the downstream-side member caused by a change of a position of the steering operation member toward a forward direction of the vehicle.

3. The vehicle steering system according to claim 2, comprising:
an intermediate shaft disposed between the steering shaft and the steering gear box and including the upstream-side member and the downstream-side member; and
a column moving mechanism capable of moving the column in a front-rear direction of the vehicle,
wherein the rotation transmitter is switched from the transmission state to the non-transmission state by a relative movement of the upstream-side member and the downstream-side member caused by a movement of the column toward the forward direction of the vehicle.

4. The vehicle steering system according to claim 1, comprising a neutral position guide configured to guide, in the mechanically decoupling state of the coupling mechanism, rotation of the steering operation member toward the neutral position in accordance with a change of a position of the steering operation member toward a forward direction of the vehicle.

5. The vehicle steering system according to claim 4, comprising:
   wherein a second protrusion is provided for one of an inside portion of the column and an outer circumferential portion of the steering shaft, and
   wherein the neutral position guide is provided for the other of the inside portion of the column and the outer circumferential portion of the steering shaft, and
   wherein the steering shaft is moved relative to the column in the forward direction of the vehicle in a state in which the second protrusion is in contact with the neutral position guide, so that the neutral position guide guides rotation of the steering shaft about the axis toward a phase corresponding to the neutral position of the steering operation member.

6. The vehicle steering system according to claim 1, comprising a return guide configured to guide, in the mechanically decoupling state of the coupling mechanism, rotation of the steering operation member toward a phase corresponding to a steering angle of the at least one steerable wheel in accordance with a change of a position of the steering operation member toward a rearward direction of the vehicle.

7. The vehicle steering system according to claim 6, comprising:
   an upstream-side member and a downstream-side member disposed between the steering operation member and a steering gear box and movable relative to each other; and
   a third protrusion provided for one of the upstream-side member and the downstream-side member,
   wherein the return guide is provided for the other of the upstream-side member and the downstream-side member, and
   wherein the upstream-side member and the downstream-side member are moved relative to each other in the axial direction in accordance with the change of the position of the steering operation member toward the rearward direction of the vehicle in a state in which the third protrusion is in contact with the return guide, so that the return guide guides rotation of the upstream-side member toward a phase corresponding to a phase of the downstream-side member.

8. The vehicle steering system according to claim 1, comprising:
   an operation-position changing actuator configured to change a position of the steering operation member in a front-rear direction of the vehicle; and
   a controller configured to control the operation-position changing actuator so as to change the position of the steering operation member,
   wherein the controller includes a switcher configured to switch the coupling mechanism between the mechanically coupling state and the mechanically decoupling state by changing the position of the steering operation member owing to control of the operation-position changing actuator.

9. A vehicle steering system provided for a vehicle whose driving state is switchable between a manual driving state and an automatic driving state, the vehicle steering system including a coupling mechanism configured to couple a steering operation member operated by a driver and at least one steerable wheel of the vehicle,
   wherein, when the driving state of the vehicle is switched from the manual driving state to the automatic driving state, the coupling mechanism is switched from a mechanically coupling state in which the coupling mechanism mechanically couples the steering operation member and the at least one steerable wheel to each other to a mechanically decoupling state in which the coupling mechanism mechanically decouples the steering operation member and the at least one steerable wheel from each other,
   wherein the vehicle steering system includes:
      a neutral position guide configured to guide, in the mechanically decoupling state of the coupling mechanism, rotation of the steering operation member toward a neutral position in accordance with a change of a position of the steering operation member toward a forward direction of the vehicle;
      a steering shaft coupled to the steering operation member such that the steering shaft is rotatable about an axis thereof integrally with the steering operation member; and
      a column holding the steering shaft such that the steering shaft is rotatable about the axis, the column being held by a body of the vehicle so as to be unrotatable about the axis relative to the body of the vehicle,
   wherein a second protrusion is provided for one of an inside portion of the column and an outer circumferential portion of the steering shaft,
   wherein the neutral position guide is provided for the other of the inside portion of the column and the outer circumferential portion of the steering shaft, and
   wherein the steering shaft is moved relative to the column in the forward direction of the vehicle in a state in which the second protrusion is in contact with the neutral position guide, so that the neutral position guide guides rotation of the steering shaft about the axis toward a phase corresponding to the neutral position of the steering operation member.

* * * * *